(12) United States Patent
Fujimoto et al.

(10) Patent No.: US 8,249,223 B2
(45) Date of Patent: Aug. 21, 2012

(54) RELAY APPARATUS AND MEMORY PRODUCT

(75) Inventors: Shingo Fujimoto, Kawasaki (JP);
Masahiko Murakami, Kawasaki (JP);
Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 725 days.

(21) Appl. No.: 12/314,525

(22) Filed: Dec. 11, 2008

(65) Prior Publication Data

US 2009/0245235 A1    Oct. 1, 2009

(30) Foreign Application Priority Data

Mar. 25, 2008    (JP) .................................. 2008-078835

(51) Int. Cl.
*H04M 1/64* (2006.01)
(52) U.S. Cl. ..... 379/68; 379/67.1; 379/88.22; 379/88.25
(58) Field of Classification Search .................. 379/221, 379/67.1, 88.22, 93.08, 68, 88.25, 80, 69
See application file for complete search history.

(56) References Cited

U.S. PATENT DOCUMENTS

| | | | |
|---|---|---|---|
| 5,832,065 A * | 11/1998 | Bannister et al. | 379/93.08 |
| 6,526,128 B1 * | 2/2003 | Kermani | 379/88.22 |
| 2002/0039407 A1 * | 4/2002 | O'Donovan et al. | 379/67.1 |

FOREIGN PATENT DOCUMENTS

| | | |
|---|---|---|
| EP | 1 182 895 | 2/2002 |
| JP | 2002-135854 | 5/2002 |
| JP | 2005-198157 | 7/2005 |
| JP | 2005-204103 | 7/2005 |
| JP | 2005-522067 | 7/2005 |
| JP | 2006-244099 | 9/2006 |
| JP | 2007-19767 | 1/2007 |
| WO | 03/069947 | 8/2003 |

OTHER PUBLICATIONS

Japanese Office Action mailed Jun. 26, 2012 in corresponding Japanese Application No. 2008-078835.

* cited by examiner

*Primary Examiner* — Thjuan K Addy
(74) *Attorney, Agent, or Firm* — Staas & Halsey LLP

(57) ABSTRACT

If a call session has been established between terminal apparatuses on the sending side and receiving side when a voice packet is received from the terminal apparatus on the receiving side, a firewall apparatus sends the received voice packet to the terminal apparatus on the sending side. On the other hand, if a call session has not been established when a voice packet is received, the firewall apparatus starts buffering received voice packets. When a call session is established, the firewall apparatus sends the buffered voice packets to the terminal apparatus on the sending side.

20 Claims, 18 Drawing Sheets

FIG. 5A

| No | Call-ID | SENDING-SIDE IP | SENDING-SIDE PORT | RECEIVING-SIDE IP | RECEIVING-SIDE PORT | PROTOCOL | PROCESSING STATUS |
|---|---|---|---|---|---|---|---|
| ... | ... | ... | ... | ... | ... | ... | ... |
| 32 | 13556 | 100.254.21.33 | 15020 | ANY | ANY | UDP | STANDBY |
| ... | ... | ... | ... | ... | ... | ... | ... |

FIG. 5B

| No | Call-ID | SENDING-SIDE IP | SENDING-SIDE PORT | RECEIVING-SIDE IP | RECEIVING-SIDE PORT | PROTOCOL | PROCESSING STATUS |
|---|---|---|---|---|---|---|---|
| ... | ... | ... | ... | ... | ... | ... | ... |
| ~~32~~ | ~~13556~~ | ~~100.254.21.33~~ | ~~15020~~ | ~~ANY~~ | ~~ANY~~ | ~~UDP~~ | ~~STANDBY~~ |
| ... | ... | ... | ... | ... | ... | ... | ... |
| 40 | 13556 | 100.254.21.33 | 15020 | 200.204.25.123 | 16020 | UDP | ENABLED |
| 41 | 13556 | 200.204.25.123 | 16020 | 100.254.21.33 | 15020 | UDP | ENABLED |
| ... | ... | ... | ... | ... | ... | ... | ... |

F I G. 14

| No | Call-ID | SENDING-SIDE IP | SENDING-SIDE PORT | RECEIVING-SIDE IP | RECEIVING-SIDE PORT | PROTOCOL | PROCESSING STATUS | EXPIRATION TIME |
|---|---|---|---|---|---|---|---|---|
| ... | ... | ... | ... | ... | ... | ... | ... | ... |
| ~~32~~ | ~~13556~~ | ~~100.254.21.33~~ | ~~15020~~ | ~~ANY~~ | ~~ANY~~ | ~~UDP~~ | ~~STANDBY~~ | ~~10:24~~ |
| ... | ... | ... | ... | ... | ... | ... | ... | ... |
| 40 | 13556 | 100.254.21.33 | 15020 | 200.204.25.123 | 16020 | UDP | ENABLED | 10:35 |
| 41 | 13556 | 200.204.25.123 | 16020 | 100.254.21.33 | 15020 | UDP | ENABLED | 10:35 |
| ... | ... | ... | ... | ... | ... | ... | ... | ... |

RELAY APPARATUS AND MEMORY PRODUCT

CROSS-REFERENCE TO RELATED APPLICATION

This application is based upon and claims the benefit of priority of the prior Japanese Patent Application No. 2008-078835, filed on Mar. 25, 2008, the entire contents of which are incorporated herein by reference.

FIELD

The embodiments discussed herein are directed to a relay apparatus for sending a received audio signal to a connected party with which a call session has been established, and a memory product storing a computer program for realizing the operation of the relay apparatus with a computer.

BACKGROUND

Voice over Internet Protocol (VoIP) is one of rapidly advancing Internet Protocol (IP) telephony technologies. VoIP is used by IP phones capable of sending and receiving packets over an IP network. For example, an IP phone converts an analog voice signal of a user's speech into a digital signal, packetizes the obtained digital voice signal, and sends/receives the packets to/from an IP phone of another party over the IP network. Communication between such IP phones is controlled by a call control server located in a Local Area Network (LAN).

When the call control server receives a call from an IP phone through a LAN, it detects an IP phone on the receiving side based on communication parameters of an IP phone on the sending side, and notifies the IP phone on the receiving side that there is an incoming call. The communication parameters include a dynamically determined IP address and a port number. When the IP phone on the receiving side responds to the call, the call control server receives the response from the IP phone on the receiving side and establishes a call session between the IP phone on the receiving side and the IP phone on the sending side. Consequently, P2P (peer-to-peer) packet direct communication is started between the IP phone on the receiving side and the IP phone on the sending side.

In order to ensure certain or better communication quality (call quality), the IP phones occupy a communication bandwidth assigned in advance to send/receive packets. The IP phones send/receive various kinds of information necessary for call session control to/from the call session server and a call session gateway before starting a telephone conversation. Therefore, it takes a time until a call session is established, and, if a speaker starts talking before a call session is established, there is a possibility that the beginning of the speaker's voice is cut off.

Hence, there is an IP phone capable of preventing cut-off of the beginning of the speaker's voice immediately after the start of the conversation (see Japanese Laid-open Patent Publication No. 2007-19767). This IP phone stores the transmitted voice as Realtime Transport Protocol (RTP) packets in its buffer memory until a call session is established, and sends the packets in the stored order to an IP network. Thus, it is possible to prevent cut-off of the beginning of voice at the start of a conversation.

SUMMARY

It is an aspect of the embodiments discussed herein to provide a relay apparatus which, if a call session has been established when an audio signal is received, the relay apparatus sends the received audio signal to a connected party with which the call session has been established, stores a received audio signal if a call session has not been established when the audio signal is received and sends the stored audio signal to a connected party when a call session is established.

According to an aspect of the embodiments discussed herein, when sending a received audio signal to a connected party with which a call session has been established, the relay apparatus can decide whether or not it is possible to send the audio signal by determining whether or not a call session has been established when the audio signal is received. When the relay apparatus determines that a call session has not been established, the relay apparatus stores the received audio signal, and thus it is possible to temporarily store the audio signal that is received before the establishment of a call session. Further, by sending the stored signal to a connected party when a call session is established, the relay apparatus can certainly send the audio signal received before the establishment of the call session.

Additional objects and advantages of the embodiments discussed herein will be set forth in part in the description which follows, and in part will be obvious from the description, or may be learned by practice of the embodiments discussed herein. The object and advantages of the embodiments discussed herein will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIGS. 5A and 5B are schematic views showing the contents of a communication control table stored in a memory section of the firewall apparatus;

FIG. 14 is a schematic view showing the contents of a communication control table stored in a memory section of the firewall apparatus;

DESCRIPTION OF EMBODIMENTS

With the recent progress of communication technologies, there are cases where malicious users perform unauthorized actions, such as invading an IP network and stealing data or wiretapping conversations. Hence, higher security is required. There is a case where an IP network is built with a firewall apparatus having a function to block unauthorized access from external networks. In this case, the firewall apparatus is linked with a call control server, obtains communication parameters such as IP addresses of IP phones and blocks irrelevant communication by adding a control rule that permits communication during only a period in which communication is performed between IP phones.

However, in the case where local IP addresses are used, IP addresses and port numbers of IP phones are dynamically determined, and therefore the firewall apparatus is unable to establish a call session with the IP phones until it obtains the determined IP addresses and port numbers. Hence, if voice data packet is received from an IP phone before a call session is established, the voice data packet is not sent to the destination, and there occurs cut-off of the beginning of voice immediately after the establishment of the call session.

Accordingly, it is an object of the embodiments discussed herein to provide a relay apparatus capable of reducing cut-off of the beginning of voice immediately after the establishment of a call session, and a memory product storing a computer program for realizing the relay apparatus with a computer.

(Embodiment 1)

Figure 1:
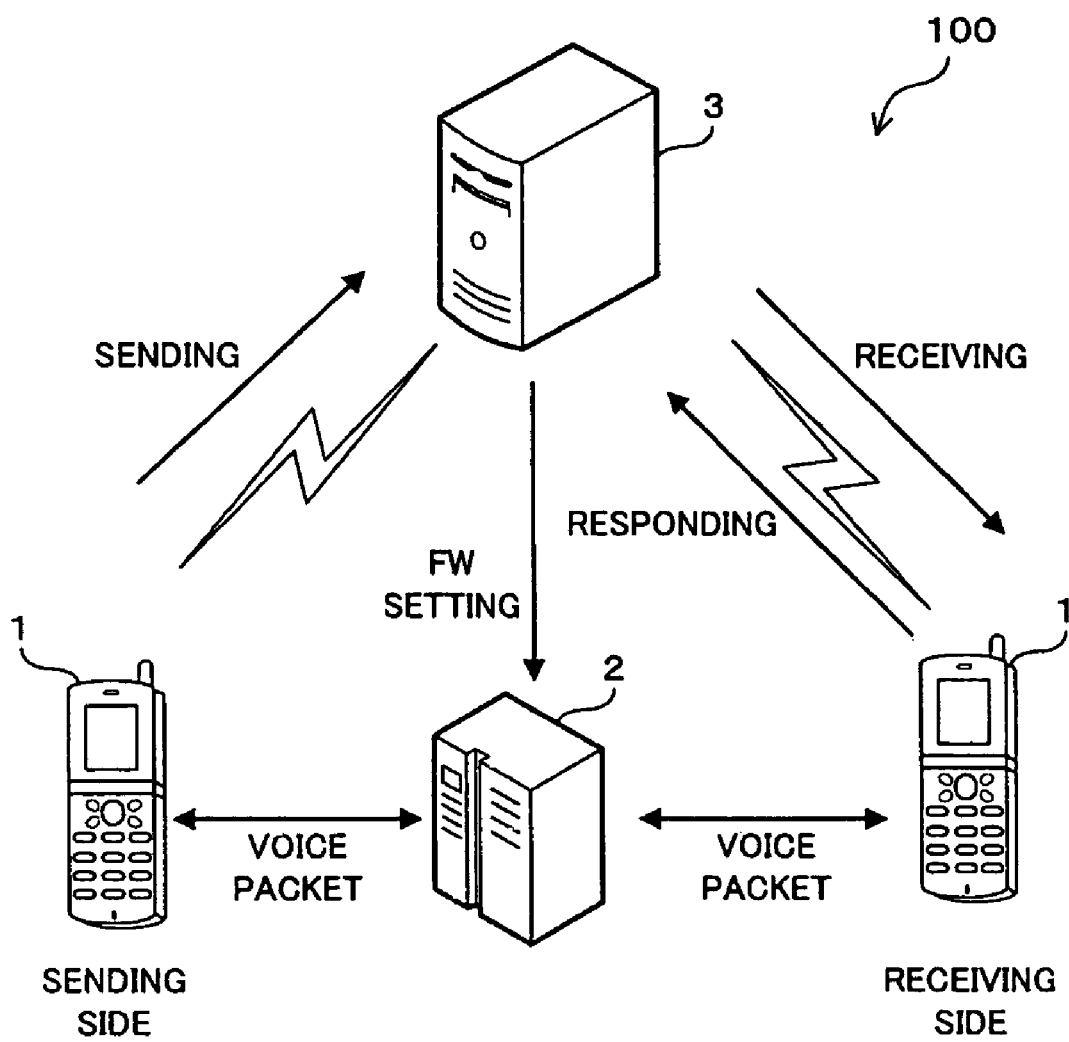
FIG. 1 is a schematic view showing a structural example of a communication system according to Embodiment 1.

The following description will explain in detail a communication system including a relay apparatus of the present invention, based on the drawings illustrating Embodiment 1. FIG. 1 is a schematic view showing a structural example of a communication system according to Embodiment 1. A communication system 100 of Embodiment 1 includes terminal apparatuses 1, 1 . . . , a firewall apparatus 2, and a call control apparatus 3 connected to a network (IP network) such as, for example, a Voice over Wireless Local Area Network (VoW-LAN).

The terminal apparatuses 1, 1 . . . are located in the same network or different networks and establish a call session by a Session Initiation Protocol (SIP). The terminal apparatus 1, 1 . . . are capable of performing wireless communication over a network, and wirelessly communicate with nearby wireless access points (not shown). In the following explanation, terminal apparatus 1, 1 . . . which make a call (send a call) to other terminal apparatus 1 are referred to as the sending side (calling side), and terminal apparatuses 1, 1 . . . which receive a call from a sending-side terminal apparatus 1 are referred to as the receiving side (called side). Suppose that the terminal apparatuses 1 of the sending side and receiving side are located in mutually different networks and send/receive packetized voice signals (hereinafter referred to as voice packets) through the firewall apparatus 2.

When the terminal apparatus 1 on the sending side is making a call, a call control message indicating a call request (call connection request) is sent as a packet to the call control apparatus 3. The call control apparatus 3 obtains the phone numbers of the terminal apparatuses 1 of the sending side and receiving side from the received packet. The terminal apparatus 1 on the receiving side receives a packet notifying the reception of a call, which is sent from the call control apparatus 3.

The terminal apparatus 1 on the receiving side displays in the display section a message that indicates the phone number of the terminal apparatus 1 of the sending side and notifies the reception of a call from the terminal apparatus 1 of the sending side. Hence, the terminal apparatus 1 on the receiving side is capable of notifying its owner (user) of reception of an incoming call. The terminal apparatus 1 on the receiving side plays a ring tone, and the user of the terminal apparatus 1 on the receiving side who has known the reception of an incoming call operates the operation section, such as a keypad, to respond to the call. In this case, data indicating a response request is sent as a packet from the terminal apparatus 1 of the receiving side to the call control apparatus 3. Accordingly, the call control apparatus 3 establishes a call session between the terminal apparatuses 1 of the sending side and receiving side. After the establishment of the call session, packets are communicated between the terminal apparatuses 1 of the sending side and receiving side through the firewall apparatus 2.

As will be described in detail later, IP addresses and port numbers of the terminal apparatuses 1, 1 are necessary for communication between the terminal apparatuses 1 and 1. IP addresses and port numbers of the terminal apparatuses 1, 1 . . . according to Embodiment 1 are dynamically allotted every time the terminal apparatuses 1, 1 . . . are connected to a network. For example, when making an attempt to connect to a network, the terminal apparatuses 1, 1 . . . request a Dynamic Host Configuration Protocol (DHCP) server to allot IP addresses, and are allotted with available IP addresses among the IP addresses managed by the DHCP server.

The call control apparatus 3 is a SIP server, and performs call control according to operations, such as sending, responding, and terminating a call, of the terminal apparatuses 1 of the sending side and receiving side by sending/receiving call control messages to/from the terminal apparatuses 1, 1 . . . . More specifically, the call control apparatus 3 receives a call request from the terminal apparatus 1 on the sending side. Then, the call control apparatus 3 obtains the phone numbers of the terminal apparatuses 1 on the sending side and receiving side from the received call request. Thereafter, the call control apparatus 3 sends a voice packet notifying the reception of an incoming call from the terminal apparatus 1 on the sending side to the terminal apparatus 1 on the receiving side.

When the terminal apparatus 1 on the receiving side responded to the call, the call control apparatus 3 sets the firewall apparatus 2 (FW setting) and establishes a call session between the terminal apparatuses 1 of the sending side and receiving side. Thus, it is possible to start communication between the terminal apparatuses 1 of the sending side and receiving side through the respective networks. After the establishment of the call session, the terminal apparatuses 1 on the sending side and receiving side directly send/receive voice packets through the firewall apparatus 2.

The firewall apparatus 2 passes only voice packets to be used in necessary communication among communications between the terminal apparatuses 1 of the sending side and receiving side, and blocks other voice packets. More specifically, the call control apparatus 3 sets control rules, and the firewall apparatus 2 passes or blocks voice packets in communication between the networks according to the set control rules. Hence, the firewall apparatus 2 blocks attacks and unauthorized access between the terminal apparatuses 1 on the sending side and receiving side.

As the control rules that the firewall apparatus 2 follows to control the passage of voice packets, for example, IP addresses and port numbers are used. When IP addresses and port numbers are used, the firewall apparatus 2 passes voice packets received from the terminal apparatuses 1, 1 . . . to a port where the destination terminal apparatus 1 is waiting. The control rules in the firewall apparatus 2 can be implemented by control using only IP addresses.

The call control apparatus 3 obtains the IP address and port number of the terminal apparatus 1 of the sending side when the terminal apparatus 1 of the sending side makes a call request. The call control apparatus 3 obtains the IP address and port number of the terminal apparatus 1 of the receiving side when the terminal apparatus 1 of the receiving side responds to a received call. The firewall apparatus 2 is set by the call control apparatus 3 based on the obtained information, and establishes a call session between the terminal apparatuses 1 of the sending side and receiving side. After the establishment of the call session, the terminal apparatuses 1 of the sending side and receiving side communicate RTP voice packets via the firewall apparatus 2.

Different ports are used as a port for sending/receiving call control messages and a port for RTP voice packet communication.

Figure 2:
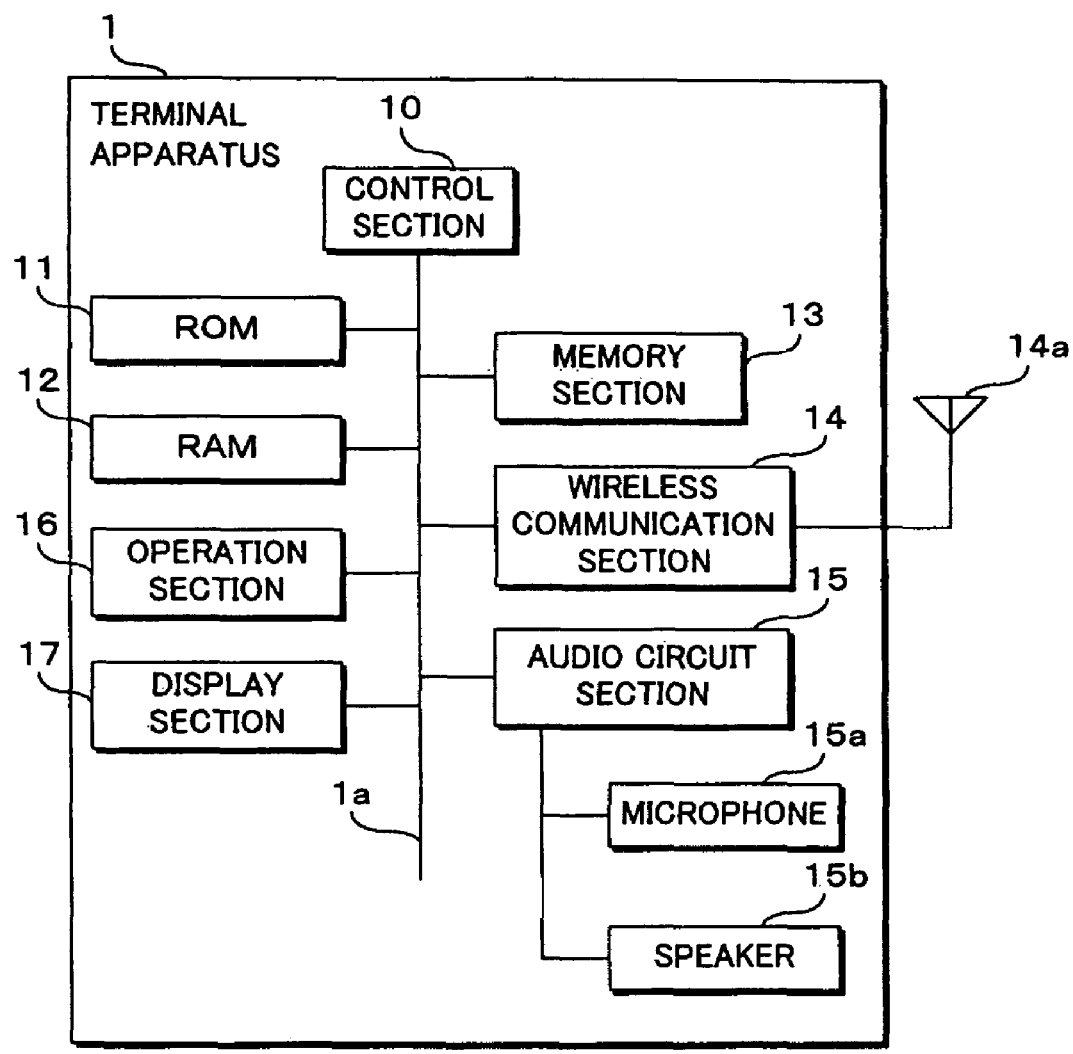
FIG. 2 is a block diagram showing a structural example of a terminal apparatus according to Embodiment 1.

FIG. 2 is a block diagram showing a structural example of the terminal apparatus 1 according to Embodiment 1. The terminal apparatus 1 of Embodiment 1 comprises a control section 10, a Read Only Memory (ROM) 11, a Random Access Memory (RAM) 12, a memory section 13, a wireless communication section 14, an audio circuit section 15, an operation section 16, a display section 17 etc. These hardware sections are connected to each other through a bus 1*a*.

The control section 10 is a Central Processing Unit (CPU) or a Micro Processing Unit (MPU). The control section 10 suitably reads a control program, which is stored in advance in the ROM 11 or the memory section 13, into the RAM 12 and executes the control program according to predetermined timing. The control section 10 controls the operations of the above-mentioned hardware sections. In the ROM 11, there are stored, in advance, various control programs that are necessary for operating the terminal apparatus 1 as a terminal apparatus capable of being used in the communication system 100. The RAM 12 is a Static RAM (SRAM) or a flash memory, and temporarily stores various kinds of data generated when the control section 10 executes the control programs.

The memory section 13 is a non-volatile memory such as a flash memory. In the memory section 13, there are stored, in advance, various control programs that are necessary for operating the terminal apparatus 1 as a terminal apparatus capable of being used in the communication system 100, ring tone data (ring melody) etc. Moreover, as information about the terminal apparatus 1 itself, the phone number etc. are stored in the memory section 13.

The wireless communication section 14 is connected to an antenna 14*a* for receiving radio waves for wireless communication through the network, and establishes a connection to a nearby wireless access point through the antenna 14*a* according to an instruction from the control section 10. If there is no wireless access point within a predetermined range from the terminal apparatus 1, the terminal apparatus 1 is unable to perform communication through the network.

The operation section 16 includes various operation keys necessary for the user to operate the terminal apparatus 1. When the user operates each operation key, the operation section 16 sends a control signal corresponding to the operated operation key to the control section 10, so that the control section 10 executes a process corresponding to the obtained control signal.

The display section 17 is a liquid crystal display, for example, and displays the operation status of the terminal apparatus 1, information entered through the operation section 16, information to be reported to the user etc., according to an instruction from the control section 10.

A microphone 15*a* and a speaker 15*b* are connected to the audio circuit section 15. When the terminal apparatus 1 is used as a telephone, the microphone 15*a* collects sounds spoken by the user and transmits them to the audio circuit section 15. When the terminal apparatus 1 is used as a telephone, the speaker 15*b* outputs a ring tone, and talking sound from the sender (communicating party).

The audio circuit section 15 includes an A/D converter (not shown). The audio circuit section 15 generates a digital audio signal by performing an A/D conversion process on an analog audio signal obtained by collecting sounds with the microphone 15*a*, and sends the obtained digital audio signal to the wireless communication section 14. The wireless communication section 14 converts the digital audio signal sent from the audio circuit section 15 into voice packets, and sends the obtained voice packets through the antenna 14*a* to the terminal apparatus 1 of the communicating party.

Moreover, the audio circuit section 15 causes the speaker 15*b* to output a ring tone based on the ring tone data read from the memory section 13, according to an instruction from the control section 10. The audio circuit section 15 includes a D/A converter (not shown), generates an analog audio signal by performing a D/A conversion process on the digital audio signal received from the terminal apparatus 1 of the communicating party through the wireless communication section 14, and causes the speaker 15*b* to output the talking sound based on the obtained audio signal, according to an instruction from the control section 10.

The wireless communication section 14 converts the voice packets received from the network into digital audio signals, and sends the obtained digital audio signals to the audio circuit section 15.

With the above-described structure, the terminal apparatus 1 is capable of communicating with the terminal apparatus 1 of the communicating party through the network. In addition, the terminal apparatus 1 is capable of sending/receiving not only voice packets, but also video packets that are generated by converting video signals, and data packets that are generated by converting data signals.

Figure 3:
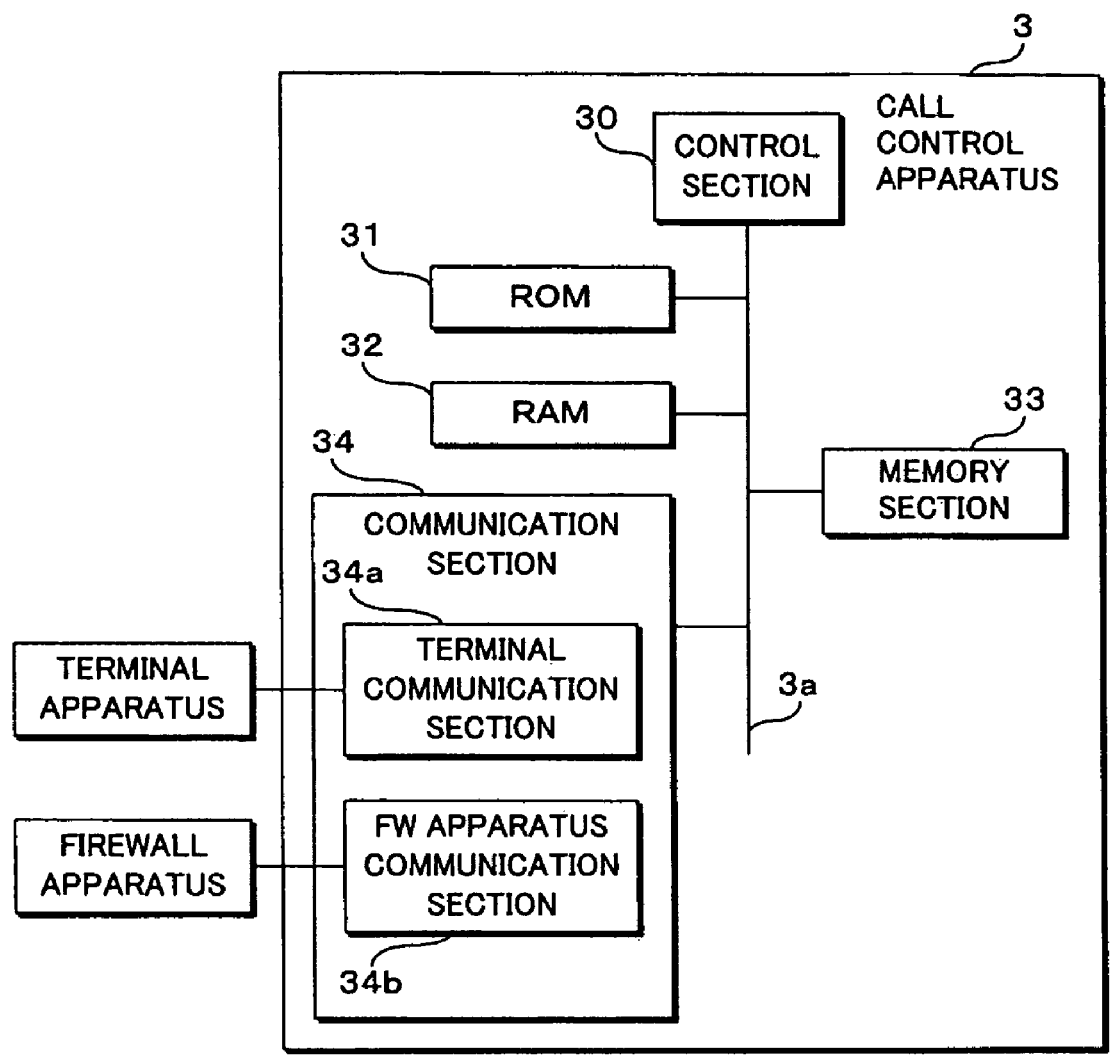
FIG. 3 is a block diagram showing a structural example of a call control apparatus according to Embodiment 1.

FIG. 3 is a block diagram showing a structural example of the call control apparatus 3 according to Embodiment 1. The call control apparatus 3 of Embodiment 1 comprises a control section 30, a ROM 31, a RAM 32, a memory section 33, and a communication section 34. These hardware sections are connected to each other through a bus 3*a*.

The control section 30 is a CPU or an MPU. The control section 30 suitably reads a control program, which is stored in the ROM 31 or the memory section 33 in advance, into the RAM 32 and executes it according to predetermined timing. The control section 30 also controls the operations of the above-mentioned hardware sections. In the ROM 31, various control programs necessary for operating the call control apparatus 3 are stored in advance. The RAM 32 is an SRAM or a flash memory, and temporarily stores various kinds of data generated when the control section 30 executes the control programs.

The memory section 33 is a non-volatile memory such as a flash memory. In the memory section 33, there are stored, in advance, various control programs necessary for operating the call control apparatus 3 as a call control apparatus of the present invention.

The communication section 34 includes a terminal communication section 34a for performing communication through a network, and a firewall apparatus communication section 34b (hereinafter referred to as the FW apparatus communication section). The terminal communication section 34a allows sending and receiving of packets including call control messages to/from the terminal apparatus 1 through a network. The FW apparatus communication section 34b allows sending and receiving of call control messages to/from the firewall apparatus 2 through a network.

The call control section 3 sends/receives call control messages to/from the firewall apparatus 2, and sets the firewall apparatus 2. For example, when the call control apparatus 3 obtains the IP address and port number of the terminal apparatus 1 of the sending side, it sends a call control message containing command codes "c=IN IP4 100.254.21.33" and "m=audio 15020 RTP/AVP 0" to the firewall apparatus 2. Accordingly, the call control apparatus 3 can set the IP address (100.254.21.33) and port number (15020) of the terminal apparatus 1 in the firewall apparatus 2.

When the call control apparatus 3 obtains the IP address and port number of the terminal apparatus 1 of the receiving side, it sends a control message containing command codes "c=IN IP4 200.204.25.123" and "m=audio 16020 RTP/AVP 0" to the firewall apparatus 2. Accordingly, the call control apparatus 3 can set the IP address (200.204.25.123) and port number (16020) of the terminal apparatus 1 in the firewall apparatus 2.

A call control message is composed of headers and a message body including command codes as mentioned above. In the headers, a method name indicating the type of each message, sender (From header), recipient (To header), Call-ID (Call-ID header) etc. are described. The same Call-ID (for example, 13556@dhcp21.example.com) is given to a single session (call control), so that the session is identified by CALL-ID.

Figure 4:
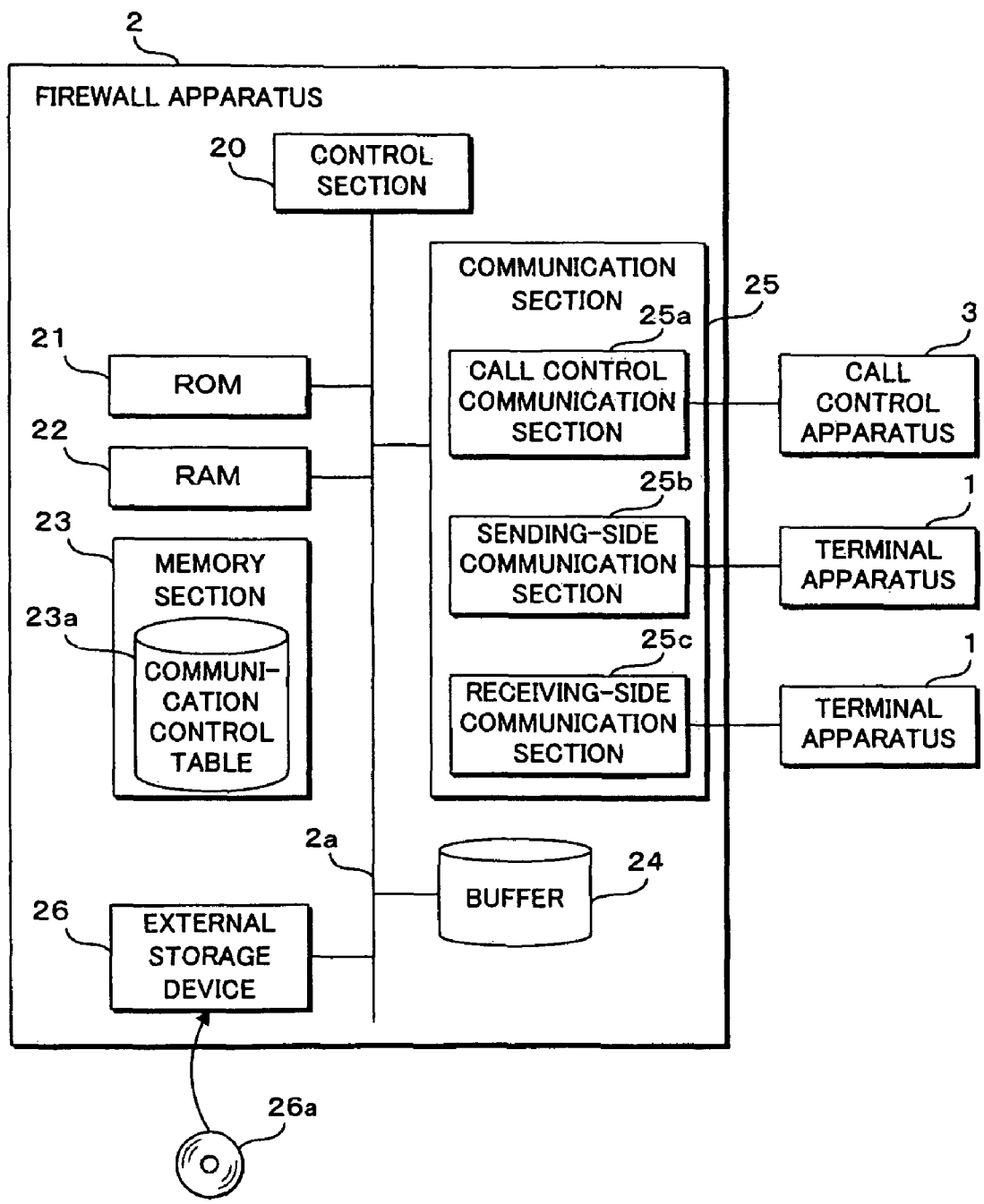
FIG. 4 is a block diagram showing a structural example of a firewall apparatus according to Embodiment 1.

FIG. 4 is a block diagram showing a structural example of the firewall apparatus 2 according to Embodiment 1. The firewall apparatus 2 of Embodiment 1 comprises a control section 20, a ROM 21, a RAM 22, a memory section 23, a buffer 24, and a communication section 25. These hardware sections are connected to each other through a bus 2a.

The control section 20 is a CPU or an MPU. The control section 20 suitably reads a control program, which is stored in the ROM 21 or the memory section 23 in advance, into the RAM 22 and executes the control program according to predetermined timing. The control section 20 also controls the operations of the above-mentioned hardware sections. In the ROM 21, various control programs necessary for operating the firewall apparatus 2 as a relay apparatus of the present invention are stored in advance. The RAM 22 is an SRAM or a flash memory, and temporarily stores various kinds of data generated when the control section 20 executes the control programs.

The memory section 23 is a non-volatile memory such as a flash memory. In the memory section 23, there are stored, in advance, various control programs necessary for operating the firewall apparatus 2 as a relay apparatus of the present invention, and a communication control table 23a as shown in FIGS. 5A and 5B.

The buffer 24 temporarily stores voice packets sent from the terminal apparatus 1. The buffer 24 stores voice packets that were sent from one of the terminal apparatuses 1 of the sending side and receiving side before a call session is established. After the terminal apparatuses 1 of the sending side and receiving side are call-connected, the voice packets stored in the buffer 24 are sequentially forwarded to the communicating party in the order they were stored.

The communication section 25 includes a call control communication section 25a, a sending-side communication section 25b, and a receiving-side communication section 25c. The call control communication section 25a enables communication to the call control apparatus 3. The sending-side communication section 25b enables communication to the terminal apparatus 1 on the sending side. The receiving-side communication section 25c enables communication to the terminal apparatus 1 on the receiving side.

The firewall apparatus 2 can have an external storage device 26 such as a CD-ROM driver or a DVD driver as shown in FIG. 4. The external storage device 26 reads a computer program for realizing the operation of the firewall apparatus 2, which is stored in advance in the memory product 26a, into the memory section 23.

It is possible to use not only a CD-ROM and a DVD-ROM, but also a Flexible Disk, a memory card, a USB (Universal Serial Bus) memory, or any other recording medium as memory product 26.

FIGS. 5A and 5B are schematic views showing the contents of the communication control table 23a stored in the memory section 23 of the firewall apparatus 2.

In the communication control table 23a, as shown in FIG. 5A, Call-ID, IP address, port number, protocol type, and processing status are stored in association with each other for each session. The processing status indicates the status of each session. For example, when the IP address and port number of the terminal apparatus 1 on the sending side are only stored, the session is in "STANDBY" status. When the IP addresses and port numbers of both the terminal apparatuses 1 of the sending side and receiving side are stored, the session is in "ENABLED" status. In Embodiment 1, the protocol is a UDP (User Datagram Protocol).

Whenever call control messages are received from the terminal apparatuses 1, 1 ..., the control section 20 stores a session in the communication control table 23a, or deletes a session from the communication control table 23a. For example, when the terminal apparatus 1 on the sending side sends a call, the control section 20 of the firewall apparatus 2 receives a call control message from the call control apparatus 3. At this time, the call control message contains CALL-ID, and IP address and port number of the terminal apparatus 1 on the sending side. The control section 20 stores a session in the communication control table 23a as shown in the table of FIG. 5A. At this time, since the IP address of the terminal apparatus 1 on the receiving side has not been determined, "ANY" is set for the receiving-side IP address, and the processing status is "STANDBY".

When the terminal apparatus 1 on the receiving side responds to the call, the control section 20 of the firewall apparatus 2 receives a call control message from the call control apparatus 3. At this time, the call control message contains CALL-ID, and IP address and port number of the terminal apparatus 1 on the receiving side. CALL-ID is the same as CALL-ID of the call control message that the firewall apparatus 2 received when the terminal apparatus 1 on the sending side sent the call. Then, the control section 20 stores the session in the communication control table 23a as shown in the table of FIG. 5B. At this time, the control section 20 sets "ENABLED" for the processing status and deletes the session of the same Call-ID.

Figure 6:
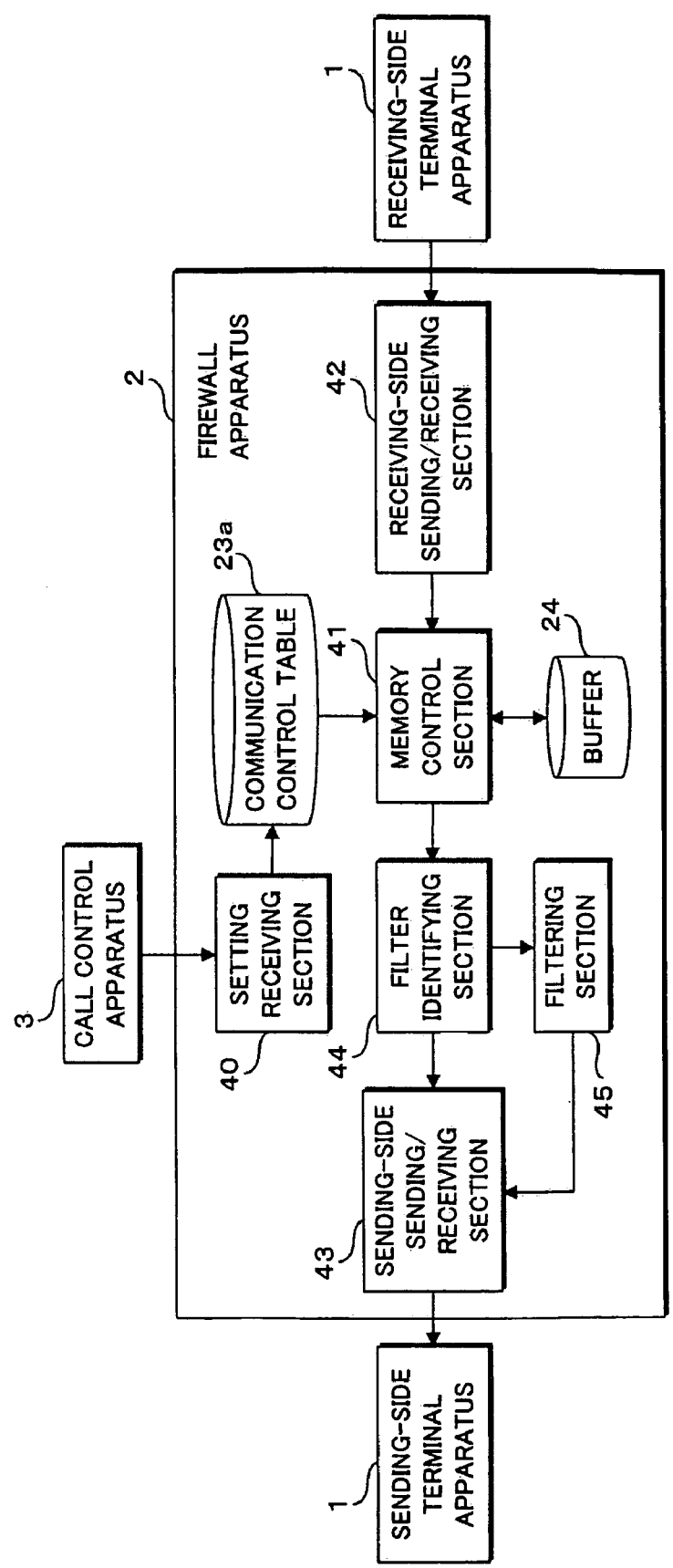
FIG. 6 is a block diagram showing the functional structure of the firewall apparatus according to Embodiment 1.

The following will explain functions that are realized when the control section 20 of the firewall apparatus 2 executes the control program stored in the ROM 21 or the memory section 23 in the communication system 100 having the above-described structure. FIG. 6 is a block diagram showing the functional structure of the firewall apparatus 2 according to Embodiment 1.

The firewall apparatus 2 of Embodiment 1 comprises a setting receiving section 40, a memory control section 41, a receiving-side sending/receiving section 42, a sending-side sending/receiving section 43, a filter identifying section 44, and a filtering section 45. With the execution of the control programs stored in the ROM 21, or the memory section 23, by the control section 20, the firewall apparatus 2 has the above-mentioned functions.

The setting receiving section 40 receives a call control message from the call control apparatus 3. The call control message is sent from the call control apparatus 3 when the call control apparatus 3 receives a packet indicating a call request (call connection request) and a packet indicating a response request from the terminal apparatuses 1, 1 . . . . The call control message is also sent from the call control apparatus 3 when the call control apparatus 3 receives a packet indicating cancellation of the call being set up and a packet indicating termination of the call from the terminal apparatuses 1, 1 . . . . The setting receiving section 40 stores or deletes a session in/from the communication control table 23a, based on the received call control message. When the storing or deletion of the session is completed, the setting receiving section 40 notifies the call control apparatus 3 of the completion of the setting.

The memory control section 41 determines, based on the communication control table 23a, whether a voice packet received by the receiving-side sending/receiving section 42 is to be stored in the buffer 24 or outputted to the filter identifying section 44. More specifically, a voice packet contains the IP address and port number of the terminal apparatus 1 of the communicating party. The memory control section 41 determines whether or not a session that matches the IP address obtained from the voice packet has been stored in the communication control table 23a. If the session has been stored in the communication control table 23a and its processing status is "STANDBY", then the memory control section 41 stores the received voice packet in the buffer 24. If the session has been stored in the communication control table 23a and its processing status is "ENABLED", then the memory control section 41 outputs the received voice packet to the filter identifying section 44. If the session has not been stored in the communication control table 23a, the memory control section 41 discards the voice packet.

The filter identifying section 44 determines whether or not the voice packet contains attack data. The attack data are, for example, programs which cause erroneous operations of the terminal apparatus 1. When the voice packet does not contain attack data, the filter identifying section 44 outputs the voice packet to the sending-side sending/receiving section 43. If the voice packet contains attack data, the filter identifying section 44 outputs the voice packet to the filtering section 45.

The filtering section 45 modifies the attack data contained in the voice packet into harmless data, or discards the voice packet and terminates the communication. The filtering section 45 outputs the modified voice packet to the sending-side sending/receiving section 43, and then the sending-side sending/receiving section 43 sends the voice packet to the terminal apparatus 1 on the sending side.

Figure 7:
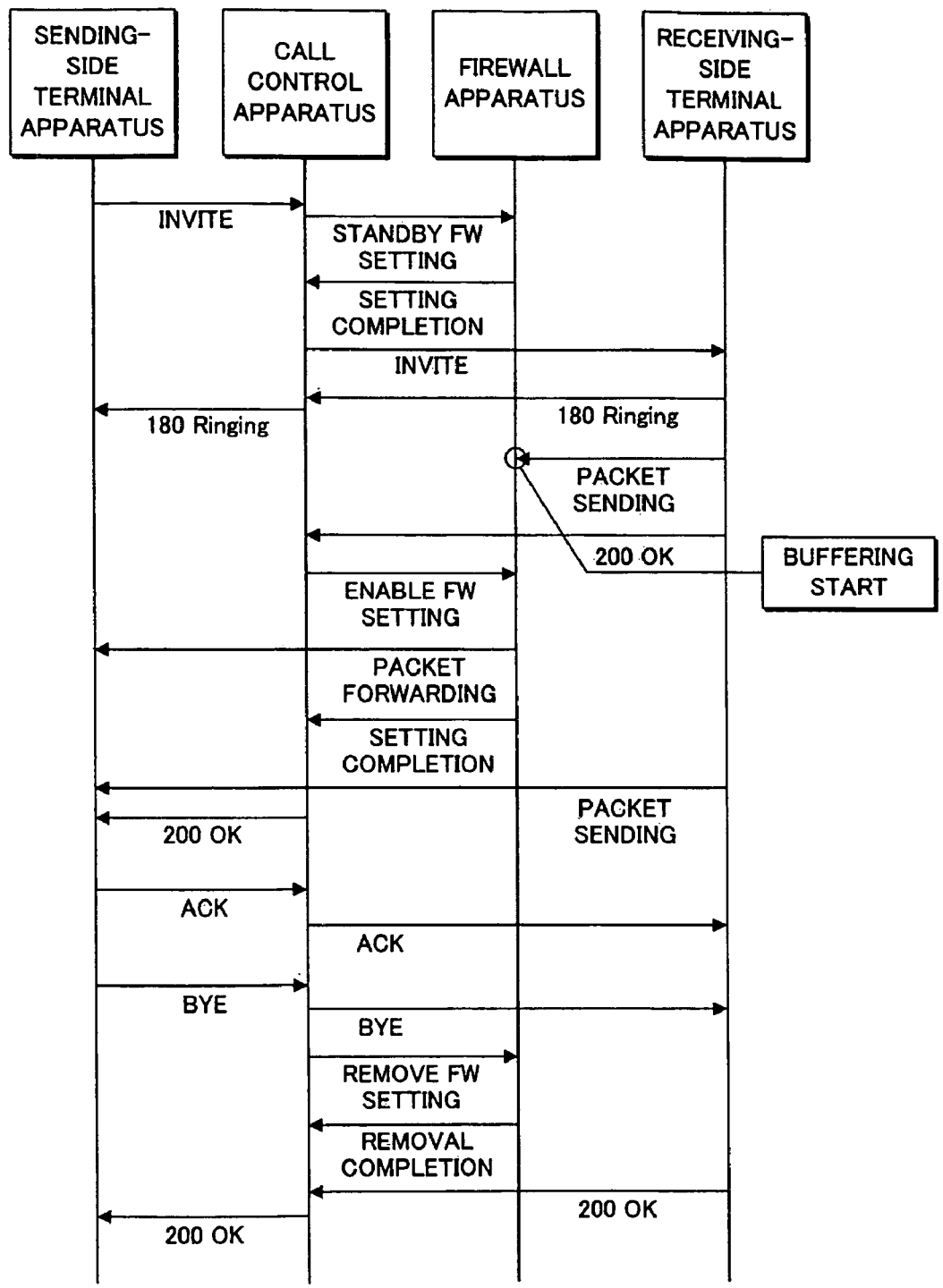
FIG. 7 is a schematic view for explaining the operation sequence of the communication system.

Next, the operation sequence of the communication system 100 will be explained. FIG. 7 is a schematic view for explaining the operation sequence of the communication system 100.

When starting a call (call control), the terminal apparatus 1 on the sending side sends a call request, namely a call connection request method (INVITE method). When the call control apparatus 3 receives the INVITE method, it obtains the IP address of the terminal apparatus 1 of the sending side and sends a call control message to the firewall apparatus 2 based on the IP address. The call control message at this time is called a standby FW setting.

The firewall apparatus 2 which has received the standby FW setting sets the firewall setting. More specifically, CALL-ID, and the IP address and port number of the terminal apparatus 1 of the sending side are stored in the communication control table 23a as shown in the upper table of FIG. 5. After completing the setting, the firewall apparatus 2 notifies the call control apparatus 3 of the completion of the setting.

When the call control apparatus 3 is notified of the completion of the setting, it forwards the INVITE method received from the terminal apparatus 1 on the sending side to the terminal apparatus 1 on the receiving side. The terminal apparatus 1 on the receiving side which has received the INVITE method sends a provisional response (180 Ringing) to the terminal apparatus 1 on the sending side through the call control apparatus 3. The provisional response is a response to tell the terminal apparatus 1 on the sending side that a notification of reception of an incoming call is being given by playing a ring tone etc. on the terminal apparatus 1 of the receiving side.

At this time, the firewall apparatus 2 has not yet established a call session between the terminal apparatuses 1 of the sending side and receiving side. When a voice packet is sent from the terminal apparatus 1 of the receiving side in this state, the firewall apparatus 2 starts buffering received voice packets. In other words, whenever the firewall apparatus 2 receives voice packets, it stores them sequentially in the buffer 24.

When the user performs a responding operation, the terminal apparatus 1 on the receiving side sends a final response (200 OK) to the call control apparatus 3. When the call control apparatus 3 receives the final response, it obtains the IP address of the terminal apparatus 1 of the receiving side and sends a call control message to the firewall apparatus 2 based on the IP address. The call control message at this time is called an enable FW setting.

The firewall apparatus 2 which has received an enable FW setting sets the firewall setting. More specifically, as shown in the lower table of FIG. 5, the firewall apparatus 2 stores CALL-ID, the IP address and port number of the terminal apparatus 1 of the sending side, and the IP address and port number of the terminal apparatus 1 of the receiving side in the communication control table 23a. Then, the firewall apparatus 2 deletes a session that has the same CALL-ID with the enable FW setting and the "STANDBY" processing status from the communication control table 23a. At this time, among voice signals that match the session with the "STANDBY" processing status in the buffer 24, voice packets which do not match the session with the "ENABLED" processing status are discarded. After completing the setting, the firewall apparatus 2 notifies the call control apparatus 3 of the completion of the setting. Accordingly, a call session between the terminal apparatuses 1 of the sending side and receiving side is established. By first reflecting the enable setting and then reflecting the standby setting, a newly set enable setting is evaluated with top priority, and audio signals that are not allowed among the buffered audio signals are automatically discarded by deletion of the standby setting.

At this timing, the firewall apparatus 2 forwards the voice packets stored in the buffer 24 to the terminal apparatus 1 on the sending side in the order they were stored. Consequently, the voice spoken by the user of the terminal apparatus 1 on receiving side before establishing a call session can be outputted to the terminal apparatus 1 on the sending side, and thus it is possible to prevent cut-off of the beginning of voice at the start of communication.

After completing the setting, the firewall apparatus 2 notifies the call control apparatus 3 of the completion of the setting. Then, the voice packets sent from the terminal apparatus 1 of the receiving side are sent to the terminal apparatus 1 of the sending side through the firewall apparatus 2. At this time, the voice packets are sent directly to the terminal apparatus 1 of the sending side without storing them in the buffer 24 of the firewall apparatus 2. Although not shown in the drawings, the firewall apparatus 2 filters the voice packets, and, if a voice packet contains attack data, deletes the attack data or discards the voice packet.

A final response (200 OK) is sent from the call control apparatus 3 to the terminal apparatus 1 on the sending side. The terminal apparatus 1 on the sending side which has received the final response sends a response (ACK method) for acknowledgement of the final response to the call control apparatus 3 through the call control apparatus 3 to the terminal apparatus 1 on the receiving side.

When a call termination operation is performed by the user, the terminal apparatus 1 on the sending side sends a termination request (BYE method) to the terminal apparatus 1 on the receiving side through the call control apparatus 3. The call control apparatus 3 which has received the BYE method sends a call control message to the firewall apparatus 2. The call control message at this time is called a remove FW setting. The firewall apparatus 2 which has received the remove FW setting deletes a session having the same CALL-ID with the remove FW setting from the communication control table 23a. The firewall apparatus 2 notifies the call control apparatus 3 of the completion of the removal.

The terminal apparatus 1 on the receiving side which has received the BYE method sends a response (200 OK) for notifying the success of termination to the terminal apparatus 1 on the sending side through the call control apparatus 3.

In FIG. 6 and FIG. 7, the voice packets are sent from the terminal apparatus 1 on the receiving side, but they can be sent from the terminal apparatus 1 on the sending side.

Next, the following will explain the operations of the call control apparatus 3 and the firewall apparatus 2 in the communication system 100.

Figure 8:
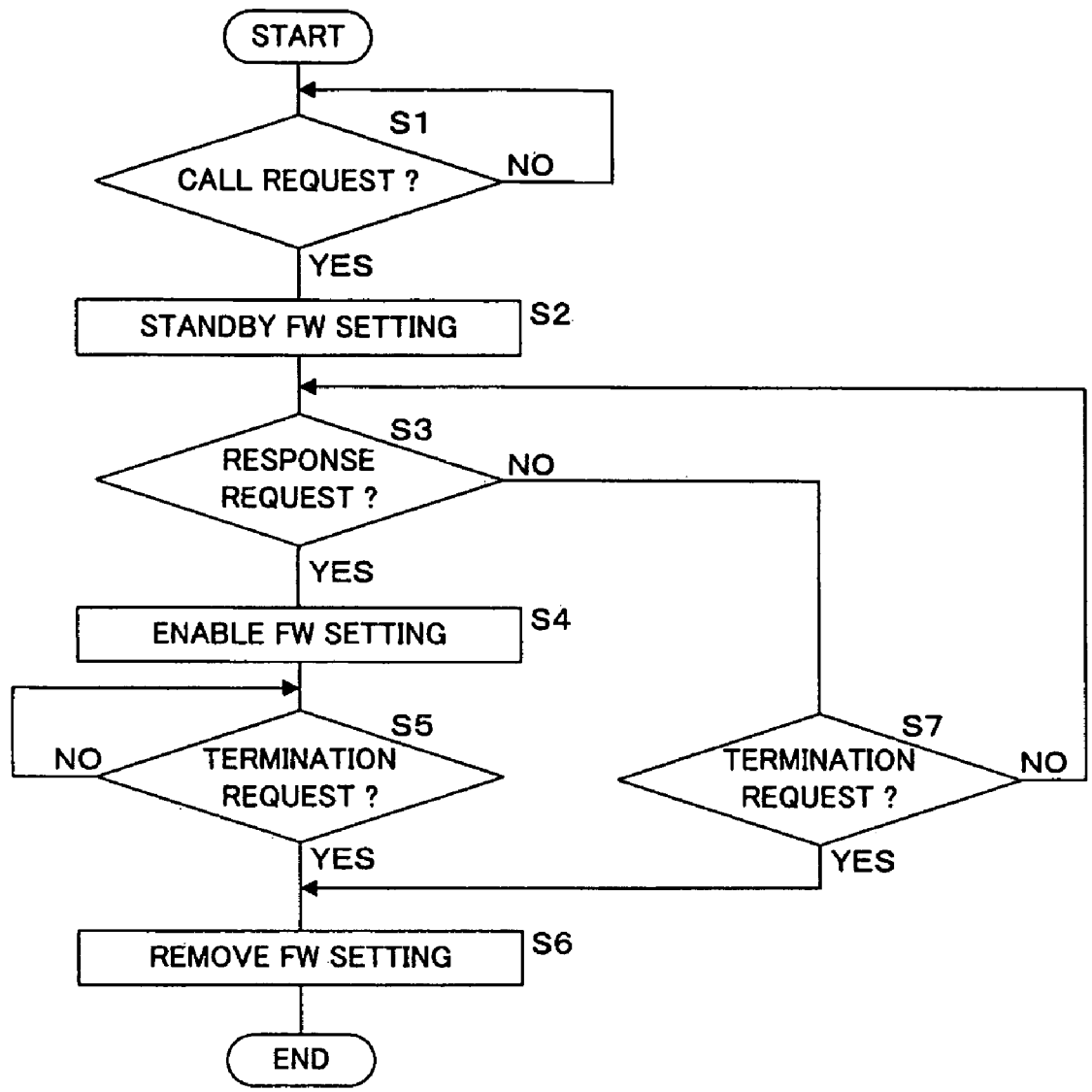
FIG. 8 is a flowchart showing the processing steps performed by the call control apparatus.

FIG. 8 is a flowchart showing the processing steps performed by the call control apparatus 3.

The control section 30 determines whether or not a call request has been received from a terminal apparatus 1 (S1). The call request is data indicating a call session request and sent as a packet from the terminal apparatus 1 on the sending side. If a call request has not been received (S1: NO), the control section 30 waits until a call request is received. If a call request has been received (S1: YES), the control section 30 sends a standby FW setting to the firewall apparatus 2 (S2).

The control section 30 determines whether or not a response request has been received from a terminal apparatus 1. The response request is sent as a packet from the terminal apparatus 1 on the receiving side when responding to a call request. If a response request has not been received (S3: NO), the control section 30 determines whether or not a termination request has been received from the terminal apparatus 1 on the sending side (S7). If a termination request has been received from the terminal apparatus 1 on the sending side (S7: YES), the control section 30 executes the processes in and after step S6. If a termination request has not been received from the terminal apparatus 1 on the sending side (S7: NO), the control section 30 executes the processes in and after step S3.

If a response request has been received (S3: YES), the control section 30 sends an enable FW setting to the firewall apparatus 2 (S4). The control section 30 determines whether or not a termination request has been received from the terminal apparatus 1 (S5). A termination request is sent as a packet from terminal apparatuses 1, 1 . . . on which the communication termination operation is performed by the users. If a termination request has not been received (S5: NO), the control section 30 waits. If a termination request has been received (S5: YES), the control section 30 sends a remove FW setting to the firewall apparatus 2 (S6). Then, the control section 30 finishes the operation.

Figure 9:
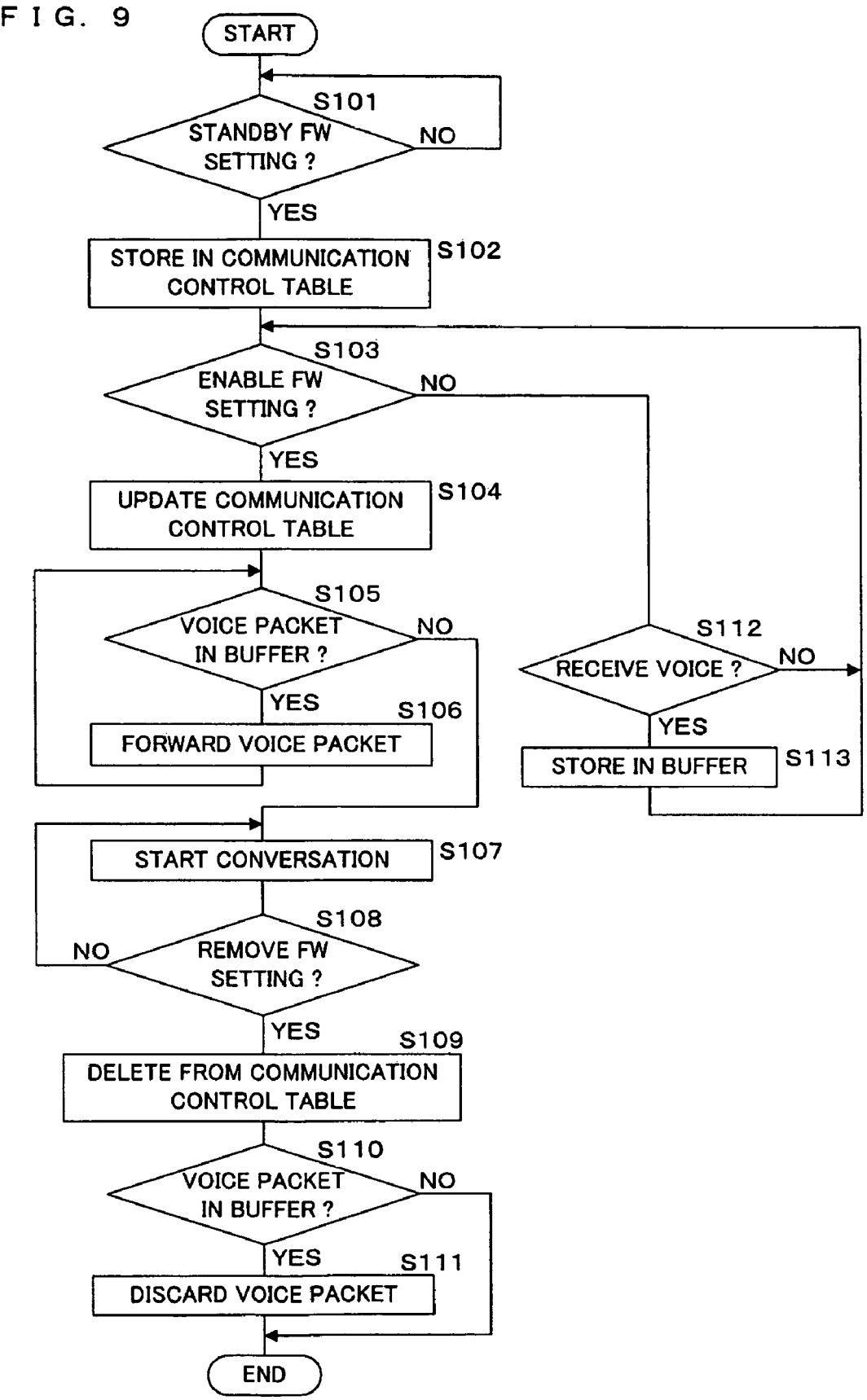
FIG. 9 is a flowchart showing the processing steps performed by the firewall apparatus.

FIG. 9 is a flowchart showing the processing steps performed by the firewall apparatus 2.

The control section 20 determines whether or not a standby FW setting has been received from the call control apparatus 3 (S101). The standby FW setting is sent from the call control apparatus 3 which received a call request (INVITE method) from the terminal apparatus 1 on the sending side. If a standby FW setting has not been received (S101: NO), the control section 20 waits until the setting is received. If a standby FW setting has been received (S101: YES), the control section 20 stores it in the communication control table 23a as shown in the upper table of FIG. 5 (S102). More specifically, a standby FW setting contains CALL-ID, and the IP address and port number of the terminal apparatus 1 of the sending side, and the control section 20 stores the CALL-ID, and the IP address and port number of the terminal apparatus 1 of the sending side in the communication control table 23a. The call control section 20 sets "STANDBY" for the processing status of the session stored at this time.

Next, the control section 20 determines whether or not an enable FW setting has been received (S103). The enable FW setting is sent from the call control apparatus 3 which received a final response (200 OK) from the terminal apparatus 1 on the receiving side. If an enable FW setting has not been received (S103: NO), the control section 20 determines whether or not a voice packet has been received from the terminal apparatus 1 (S112). If a voice packet has been received (S112: YES), the control section 20 stores the received voice packet in the buffer 24 because a call session has not been established between the terminal apparatuses 1 of the sending side and receiving side (S113).

The voice packet contains the IP address and port number of the terminal apparatus 1 of the communicating party. The control section 20 determines whether a session that matches the IP address obtained from the voice packet has been stored in the communication control table 23a shown in the upper table of FIG. 5. If the session has not been stored in the communication control table 23a, the control section 20 discards the received voice packet. If the voice packet matches a session stored with the "STANDBY" processing status, then the control section 20 stores the received voice packet in the buffer 24.

After storing the received voice packet in the buffer 24 (S113) and if a voice packet has not been received (S112: NO), the control section 20 executes the processes in and after step S103.

If an enable FW setting is received (S103; YES), the control section 20 updates the communication control table 23a as shown in the lower table of FIG. 5 (S104). In the communication control table 23a, the control section 20 stores an "ENABLED" session specifying CALL-ID, the IP address and port number of the terminal apparatus 1 of the sending side, and the IP address and port number of the terminal apparatus 1 of the receiving side. Then, the control section 20 deletes a session having the same CALL-ID with the enable FW setting and the "STANDBY" processing status from the communication control table 23a.

The control section 20 determines whether or not there are voice packets stored in the buffer 24 (S105). If there are voice packets stored (S105: YES), the control section 20 filters the voice packets in the order they were stored in the buffer 24, and forwards the voice packets to the communicating party (S106). At this time, the control section 20 forwards the voice packet which was stored first in terms of time. Then, the control section 20 returns the processing to step S105 and repeats step S106 as long as there is a voice packet stored in the buffer 24, and forwards the voice packets in the order they were stored. The control section 20 deletes the voice packets which were forwarded from the buffer 24. Hence, the voice spoken by the user before establishing a call session between the terminal apparatuses 1 can certainly be outputted from the terminal apparatus 1 of the communicating party, thereby preventing cut-off of the beginning of voice in a conversation.

If there is no voice packet stored in the buffer 24 (S105: NO), the control section 20 starts a conversation between the terminal apparatuses 1 for which a call session has been established (S107). In short, the control section 20 forwards received voice packets to the terminal apparatus 1 of the communicating party without storing them in the buffer 24. When forwarding the received voice packets to the communicating party, the control section 20 filters the voice packets, and deletes or modifies attack patterns contained in the voice packets. Or the control section 20 discards the voice packets and terminates the communication.

The control section 20 can suitably change the timing of turning the processing status of the session stored in the communication control table 23a to "ENABLED". For example, after completing the forwarding of all voice packets stored in the buffer 24, the processing status of the session can be turned to "ENABLED". There may be a case where the firewall apparatus 2 receives a new voice packet from the terminal apparatus 1 before completing the forwarding of all voice packets stored in the buffer 24. In this case, the control section 20 does not need to perform a process, such as sorting the voice packets in the order they are to be forwarded. It is also possible to avoid a disorderly conversation trouble caused by forwarding the voice packets in a wrong order.

The control section 20 determines whether or not a remove FW setting has been received (S108). The remove FW setting is sent from the call control apparatus 3 which received a termination request (BYE method) from the terminal apparatus 1. If a remove FW setting is received (S108: YES), the control section 20 deletes a session having the same CALL-ID with the remove FW setting from the communication control table 23a (S109). If a remove FW setting has not been received (S108: NO), the control section 20 executes the processes in and after step S107.

After deleting the session from the communication control table 23a, the control section 20 determines whether or not a voice packet corresponding to the deleted session has been stored in the buffer 24 (S110). If a corresponding voice packet has not been stored in the buffer 24 (S110: NO), the control section 20 just finishes the process. If a corresponding voice packet has been stored (S110: YES), the control section 20 discards the corresponding voice packet in the buffer 24 (S111) and finishes the processing.

As described above, the firewall apparatus 2 stores in the buffer 24 a voice packet which is received when a call session has not been established between the terminal apparatuses 1. After a call session is established, the firewall apparatus 2 forwards the voice packet stored in the buffer 24 to the terminal apparatus 1 of the communicating party. Hence, even when the user speaks before establishing a call session, it is possible to send the voice to the communicating party after establishing a call session, thereby preventing cut-off of the beginning of voice at the start of a conversation.

When the communicating party's line is busy, the control section 20 discards the voice packet stored in the buffer 24. Consequently, the storage area of the buffer 24 can be used for other sessions without wasting it.

(Embodiment 2)

The following will explain in detail the present invention based on the drawings illustrating a relay apparatus of Embodiment 2. Since the firewall apparatus 2 of Embodiment 2 can be realized by structures similar to the structures of the firewall apparatus 2 of Embodiment 1, the same codes are assigned to the similar structures, and the explanation thereof is omitted.

Figure 10:
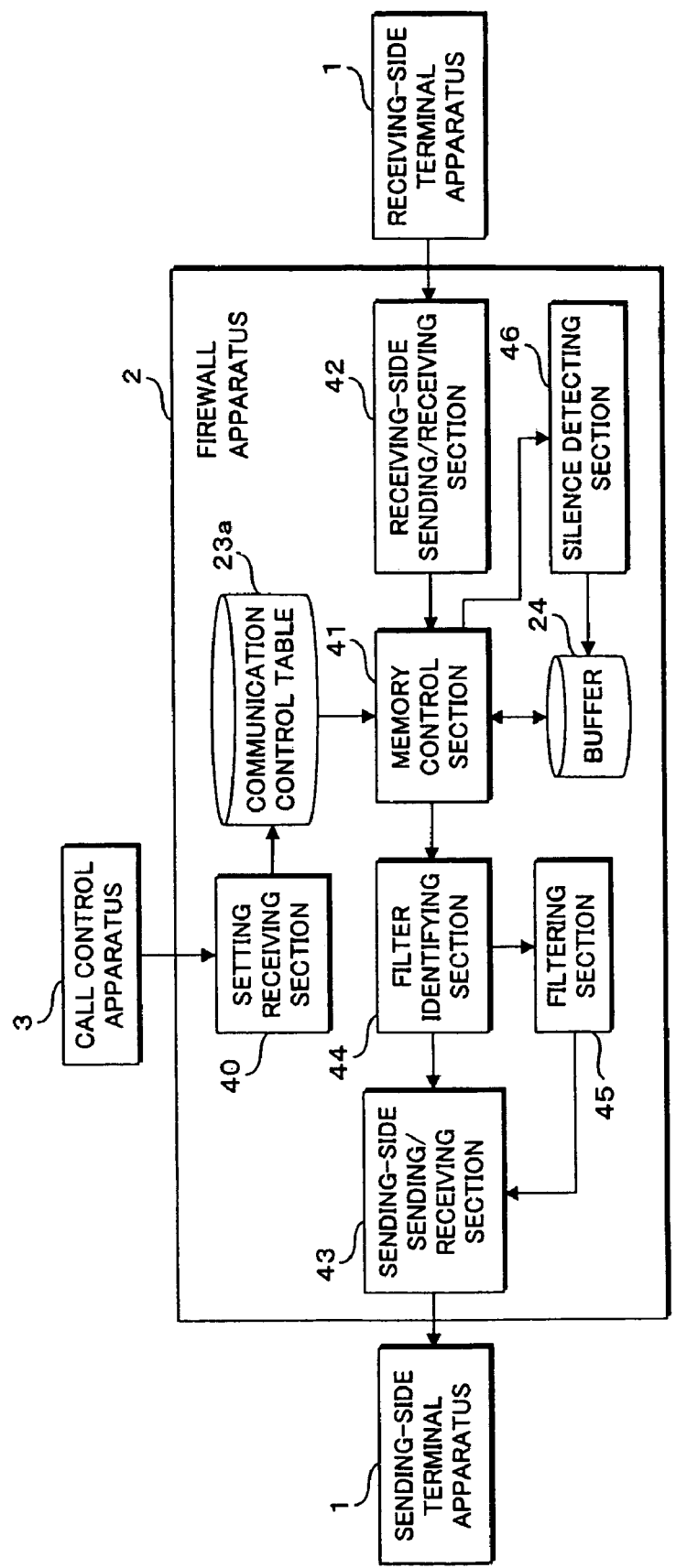
FIG. 10 is a block diagram showing the functional structure of a firewall apparatus according to Embodiment 2.

FIG. 10 is a block diagram showing the functional structure of the firewall apparatus 2 according to Embodiment 2.

The firewall apparatus 2 of Embodiment 2 further comprises a silence detecting section 46 in addition to the functions of the firewall apparatus 2 of Embodiment 1.

The silence detecting section 46 analyzes a voice packet received by the receiving-side sending/receiving section 42 and determines whether or not the voice packet is a packetized silence signal. The silence detecting section 46 retrieves only voice data from the voice packet, and measures the volume of the voice data. If the measurement result is equal to or less than certain volume, the silence detecting section 46 determines that the data is a silence packet. If the data is a silence voice packet, the silence detecting section 46 discards the voice packet. If the data is not a silence voice packet, the silence detecting section 46 outputs the voice packet to the memory control section 41.

Figure 11:
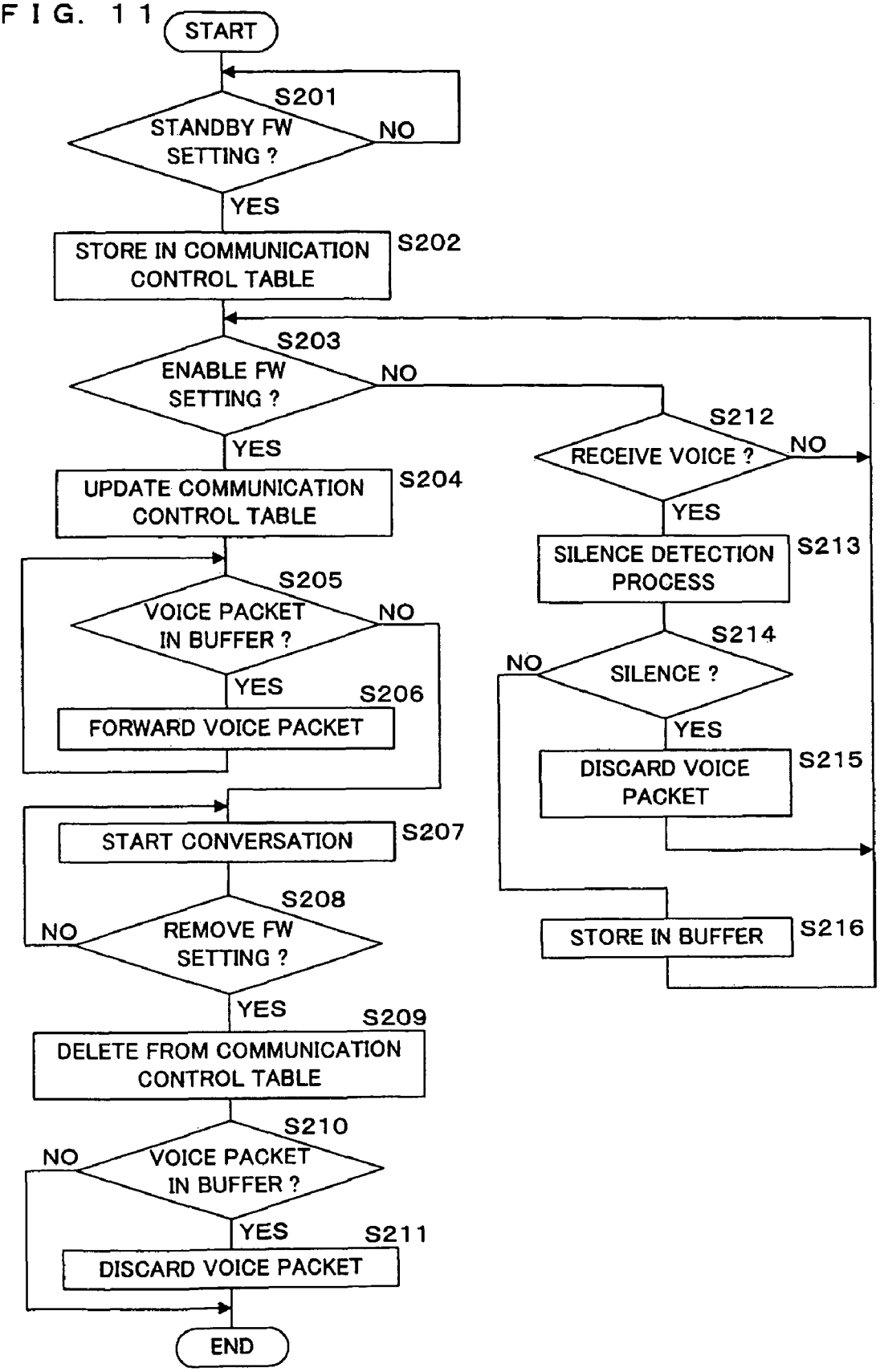
FIG. 11 is a flowchart showing the processing steps performed by the firewall apparatus.

FIG. 11 is a flowchart showing the processing steps performed by the firewall apparatus 2.

Since the operation from step S201 to step S212 in FIG. 11 is the same as the operation from step S101 to step S112 in FIG. 9, the explanation thereof is omitted.

In step S213, the control section 20 executes a silence detection process on a voice packet (S213). For example, the control section 20 retrieves only voice data from a voice packet and measures the volume of the voice data. If the measurement result is equal to or lower than certain volume, the control section 20 determines that the data is a silence voice packet.

As a result of the silence detection process, the control section 20 determines whether the received voice packet is a silence voice packet (S214). If the data is a silence voice packet (S214: YES), the control section 20 discards the received voice packet (S215). Thereafter, the control section 20 executes the processes in and after step S203. If the data is not a silence voice packet (S214: NO), the control section 20 stores the voice packet in the buffer 24 (S216). Thereafter, the control section 20 executes the processes in and after step S203.

As described above, if a received voice packet is a silence voice packet, the firewall apparatus 2 discards the received voice packet. Thus, by eliminating silence at the start of a conversation, it is possible to reduce the storage amount to be stored in the buffer 24. Moreover, by deleting silence, it is possible to reduce a delay in the conversation. In FIG. 11, although silence detection is performed on every voice packet received, it is possible to perform silence detection on only voice packets filtered by the memory control section 41. In this case, it is possible to decrease the frequency of performing silence detection. Further, as another method of discarding a silence packet, after storing all voice packets in the buffer 24, by performing silence detection when sending a voice packet in step S205, it is possible to implement an efficient process in which silence detection is performed only when a large number of voice packets are stored in the buffer 24.

(Embodiment 3)

The following will explain in detail the present invention based on the drawings illustrating a relay apparatus of Embodiment 3. Since the firewall apparatus 2 of Embodiment 3 can be realized by structures similar to the structures of the firewall apparatus 2 of Embodiment 1, the same codes are assigned to the similar structures and explanation thereof is omitted.

Figure 12:
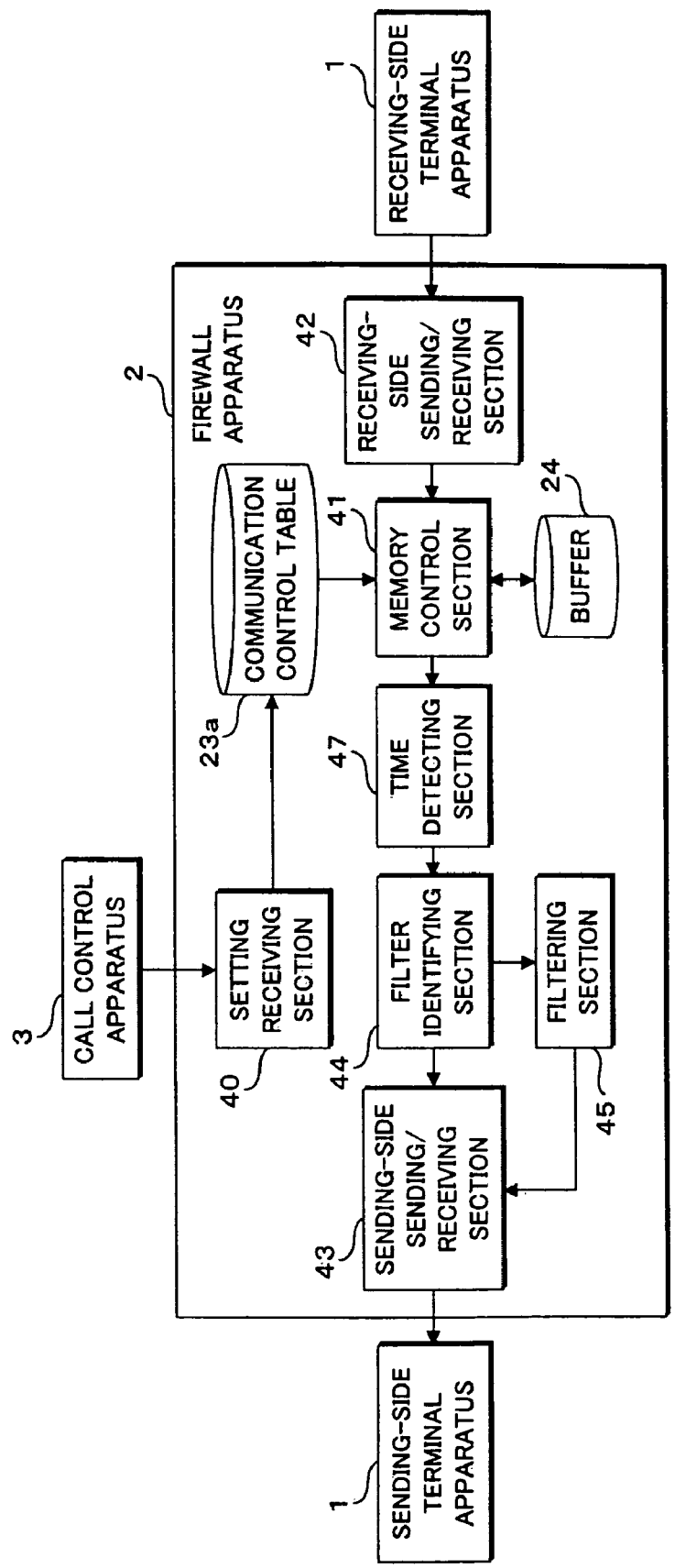
FIG. 12 is a block diagram showing the functional structure of a firewall apparatus according to Embodiment 3.

FIG. 12 is a block diagram showing the functional structure of the firewall apparatus 2 according to Embodiment 3.

The firewall apparatus 2 of Embodiment 3 further comprises a time detecting section 47 in addition to the functions of the firewall apparatus 2 of Embodiment 1.

In Embodiment 3, in a voice packet, for example, the time at which the voice packet was sent from the terminal apparatus 1 is recorded in the header information. The time detecting section 47 analyzes a voice packet obtained from the buffer 24 by the memory control section 41, and obtains the sent time of the voice packet. The time detecting section 47 determines whether or not a predetermined time has elapsed since the obtained sent time. If the predetermined time has elapsed as a result of the determination, the time detecting section 47 discards the voice packet that the memory control section 41 obtained from the buffer 24. If the predetermined time has not elapsed as a result of the determination, the time detecting section 47 outputs to the filter identifying section 44 the voice packet obtained from the buffer 24 by the memory control section 41.

Figure 13:
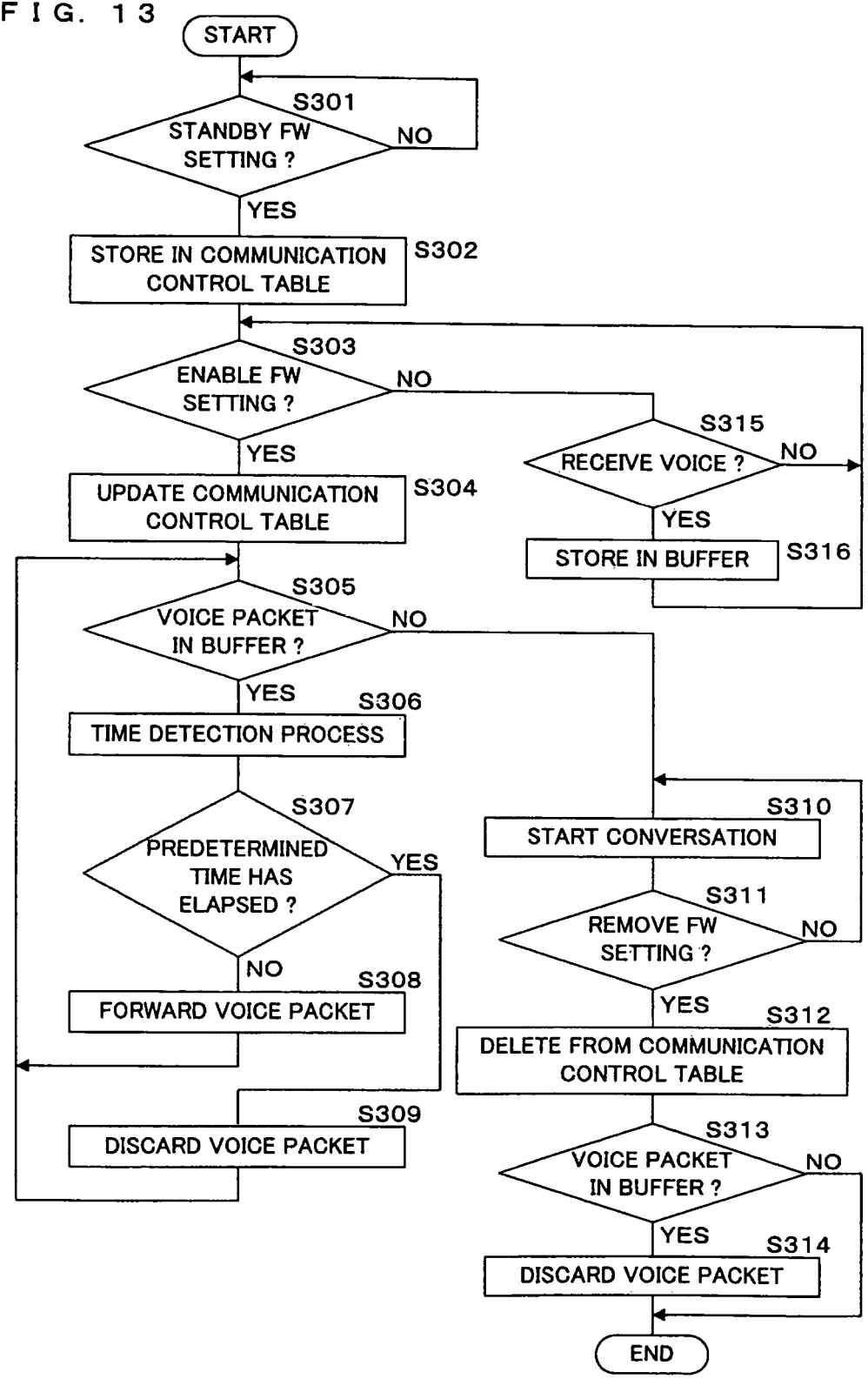
FIG. 13 is a flowchart showing the processing steps performed by the firewall apparatus.

FIG. 13 is a flowchart showing the processing steps performed by the firewall apparatus 2.

Since the operation from step S301 to step S304 in FIG. 13 is the same as the operation from step S101 to step S104 in FIG. 9, the explanation thereof is omitted.

In step S305, the control section 20 determines whether or not there is a voice packet stored in the buffer 34 (S305). If there is a voice packet stored (S305: YES), the control section 20 executes a time detection process (S306). More specifically, the control section 20 obtains the voice packet and the sent time at which the voice packet was sent. The control section 20 compares the obtained sent time with the current time and determines whether or not a predetermined time (for example, 500 milliseconds) has elapsed since the sent time (S307). If the predetermined time has elapsed (S307: YES), the control section 20 discards the voice packet obtained from the buffer 24 (S309). Thereafter, the control section 20 determines again whether or not there is a voice packet stored in the buffer 24 (S305).

If the predetermined time has not elapsed (S307: NO), the control section 20 filters the voice packet obtained from the buffer 24 and forwards it to the destination (S308). Thereafter, the control section 20 determines again whether or not there is a voice packet stored in the buffer 24 (S305). The control section 20 executes this operation on the voice packets sequentially from the voice packet that was stored first in terms of time. The control section 20 repeats forwarding or discarding of a voice packet as long as there is a voice packet stored in the buffer 24.

If there is no voice packet stored (S305: NO), the control section 20 starts a conversation between the terminal apparatuses 1 for which a call session has been established (S310). Since the processes in and after step S310 are the same as in the operation of Embodiment 1 explained with reference to FIG. 9, the explanation thereof is omitted.

As described above, the sent time contained in the header of a voice packet is compared with the current time, voice packets exceeding a preset value (for example 500 milliseconds) are discarded, and other voice packets are forwarded to the communicating party. Thus, by preventing forwarding of a voice packet which is so delayed that it is no longer retrievable by the terminal apparatus 1, it is possible to reduce a delay in the conversation and save communication bandwidth.

(Embodiment 4)

The following will explain in detail the present invention based on the drawings illustrating a relay apparatus of Embodiment 4. Since the firewall apparatus 2 of Embodiment 4 can be realized by structures similar to the structures of the firewall apparatus 2 of Embodiment 1, the same codes are assigned to the similar structures and explanation thereof is omitted.

FIG. 14 is a schematic view showing the contents of the communication control table 23a stored in the memory section 23a of the firewall apparatus 2.

In the communication control table 23a of Embodiment 4, as shown in FIG. 14, CALL-ID, IP address, port number, protocol type, and processing status are stored in association with each other for each session. Moreover, for the stored sessions, the expiration time of each session is recorded. When a session is not deleted even after its recorded expiration time, the session is forcefully deleted.

Figure 15:
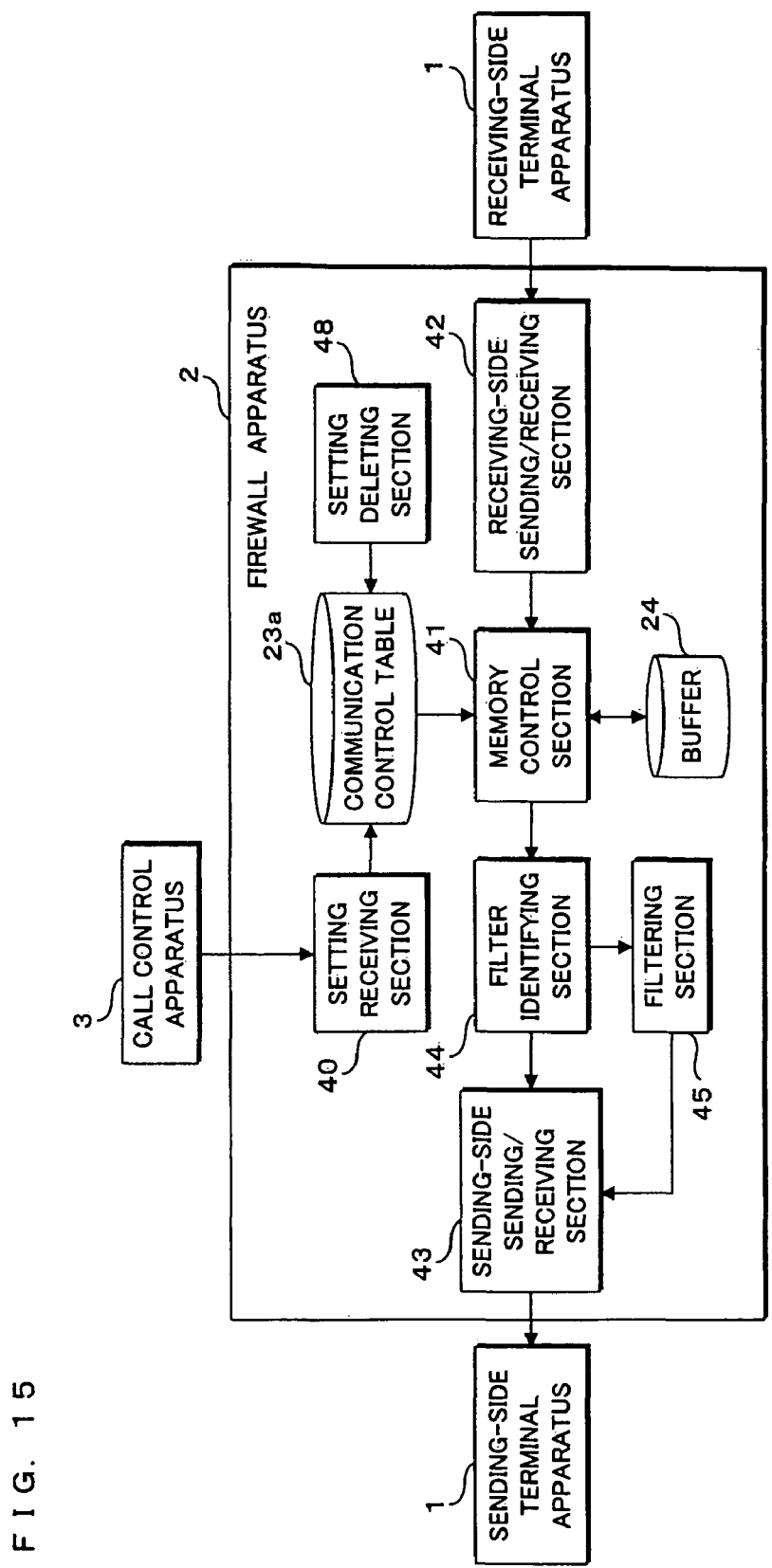
FIG. 15 is a block diagram showing the functional structure of a firewall apparatus according to Embodiment 4.

FIG. 15 is a block diagram showing the functional structure of the firewall apparatus 2 according to Embodiment 4.

The firewall apparatus 2 of Embodiment 4 further comprises a setting deleting section 48 in addition to the functions of the firewall apparatus 2 of Embodiment 1.

When storing a session in the communication control table 23a, the setting receiving section 40 records the expiration time of the stored session. For example, if the processing information about the session is "STANDBY", the setting receiving section 40 sets the expiration time to one minute after the current time. If the processing information about the session is "ENABLED", the setting receiving section 40 sets the expiration time to six hours after the current time.

The setting deleting section 48 periodically checks the expiration time of each session in the communication control table 23a. If the current time has passed an expiration time as a result of comparing the expiration time and the current time, the setting deleting section 48 deletes the corresponding session from the communication control table 23a.

Figure 16:
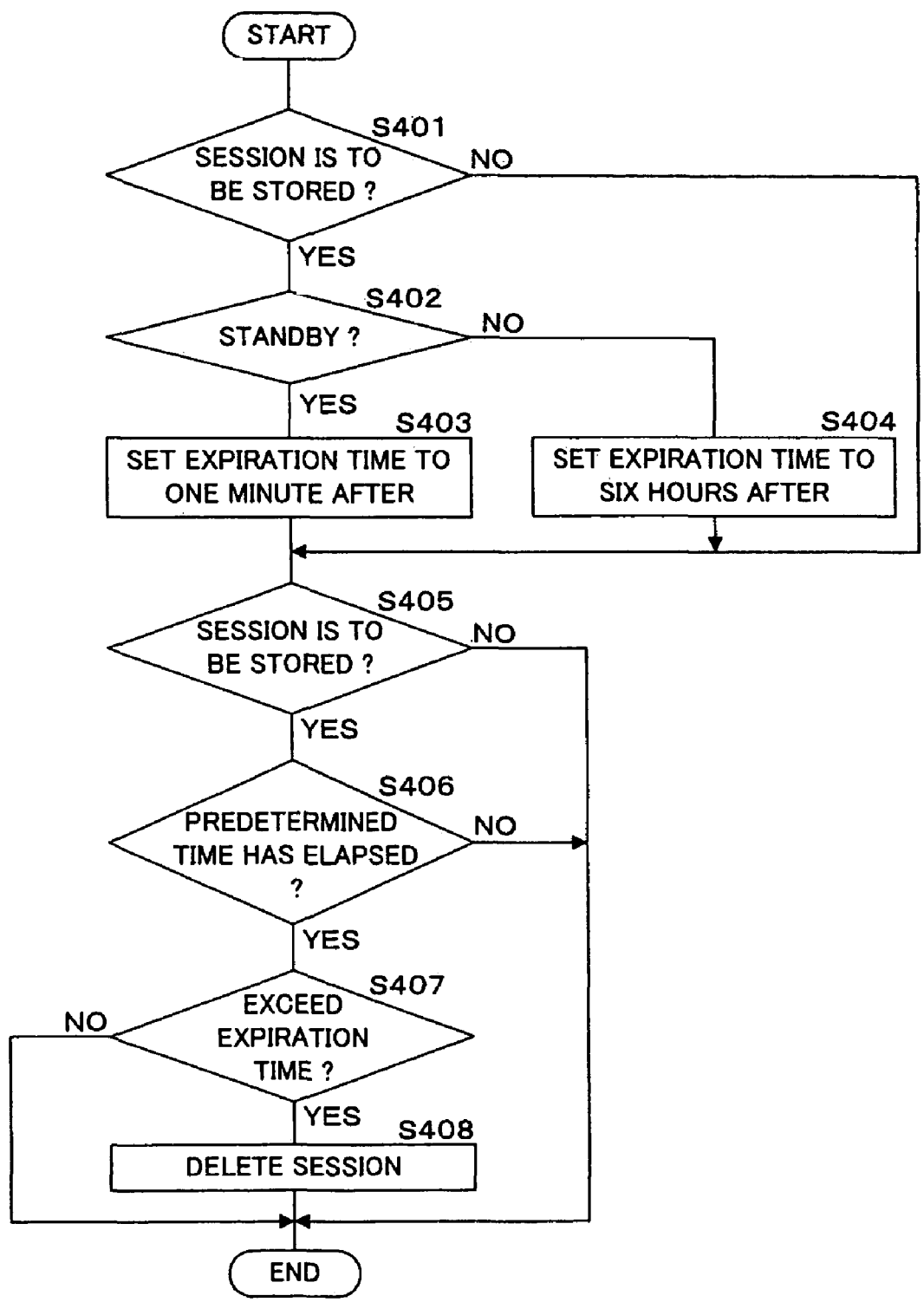
FIG. 16 is a flowchart showing the processing steps performed by the firewall apparatus.

FIG. 16 is a flowchart showing the processing steps performed by the firewall apparatus 2. FIG. 16 is a flowchart showing the processing steps that the control section 20 follows to record the expiration time of a session and delete a session that has exceeded its expiration time from the communication control table 23a. The call control in the firewall apparatus 2 of Embodiment 4 is similar to that in Embodiment 1.

The call control section 20 executes the process shown in FIG. 16 at any time and determines, upon staring a process, whether or not the session is to be stored in the communication control table 23a (S401). For example, in the case of step S102 and step S104 in FIG. 9, the session is to be stored. If the session is to be stored (S401: YES), the control section 20 determines whether or not the processing status of the session to be stored is "STANDBY" (S402).

If the processing status is "STANDBY" (S402: YES), the control section 20 sets the expiration time to one minute after the current time for the session to be stored (S403). Consequently, the expiration time of the session is recorded in the communication control table 23a as shown in FIG. 14. If the processing status is not "STANDBY" (S402: NO), that is, if the processing status is "ENABLED", the control section 20 sets the expiration time to six hours after the current time for the session to be stored (S404).

After setting the expiration time, or if the session is not to be stored (S401: NO), the control section 20 determines whether or not there is a session stored in the communication control table 23a (S405). If there is a session stored (S405: YES), the control section 20 determines whether or not a predetermined time has elapsed (S406). Here, the predetermined time is the time passed after the previous inspection of the expiration time of a session. In short, the process explained below is executed at intervals of the predetermined time (for example, one minute).

If the predetermined time has not elapsed (S406: NO), the control section 20 finishes the operation. If the predetermined time has elapsed (S406: YES), the control section 20 scans the communication control table 23a and determines whether or not there is a session that has exceeded its expiration time (S407). If there is a session that has exceeded its expiration time (S407: YES), the control section 20 deletes the session that has exceeded its expiration time from the communication control table 23a (S408). If there is no session stored in the communication control table 23a (S405: NO), or if there is no session that has exceeded its expiration time (S407: NO), the control section 20 finishes the operation.

As described above, by deleting a session that has exceeded its expiration time from the communication control table 23a, it is possible to automatically delete settings on the communication control table 23a that remain without being deleted due to malfunction of the call control apparatus 3, and it is possible to save the memory resource of the memory section 23 and reduce the management cost.

(Embodiment 5)

The following will explain in detail the present invention based on the drawings illustrating a relay apparatus of Embodiment 5. Since a firewall apparatus 2 of Embodiment 5 can be realized by structures similar to the structures of the firewall apparatus 2 of Embodiment 1, the same codes are assigned to the similar structures and explanation thereof is omitted.

Figure 17:
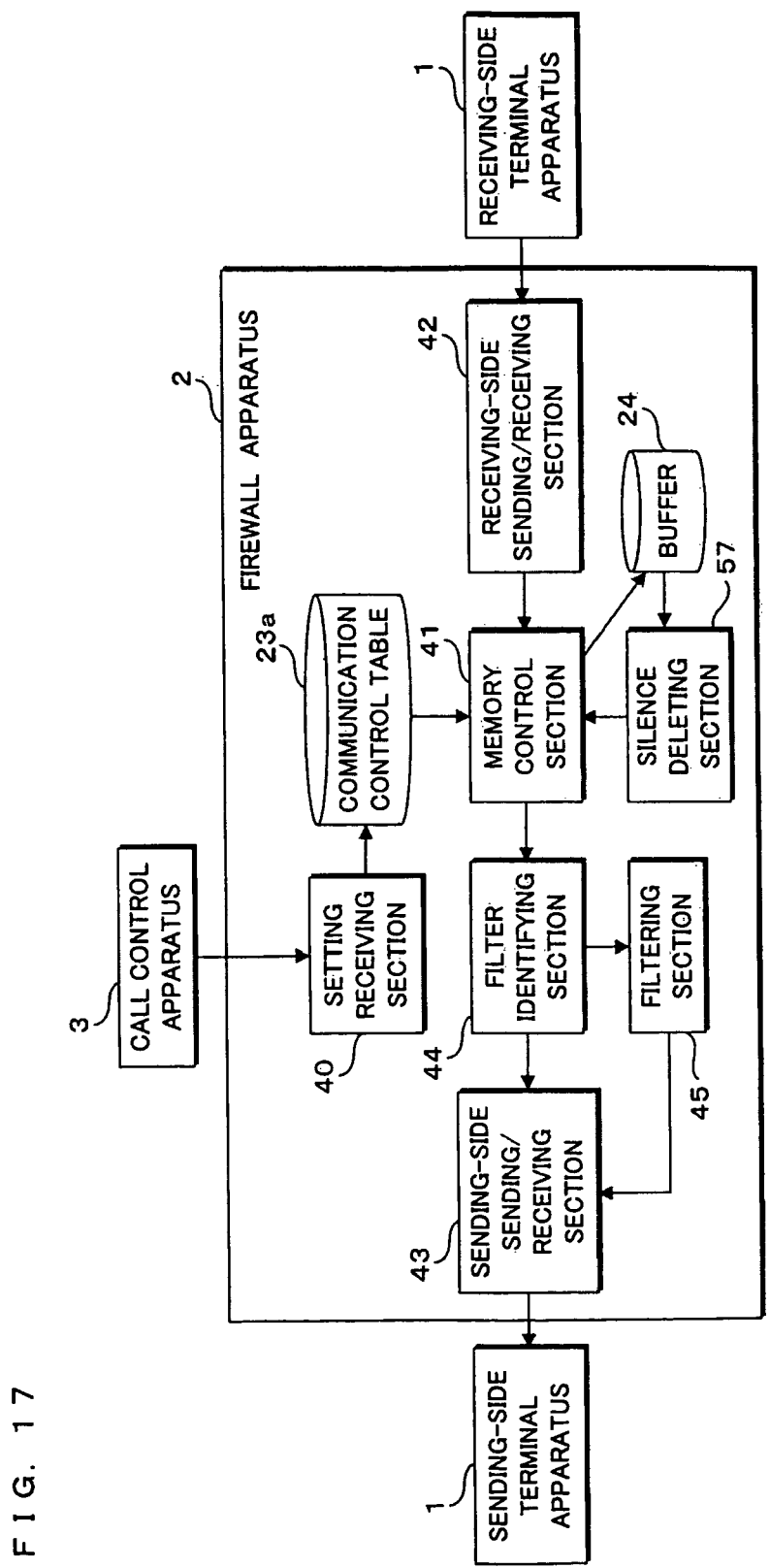
FIG. 17 is a block diagram showing the functional structure of a firewall apparatus according to Embodiment 5.

FIG. 17 is a block diagram showing the functional structure of the firewall apparatus 2 according to Embodiment 5.

The firewall apparatus 2 of Embodiment 5 further comprises a silence deleting section 57 in addition to the functions of the firewall apparatus 2 of Embodiment 1. The silence deleting section 57 performs silence detection on a voice packet stored in the memory control section 41, and deletes a voice packet from the memory control section 41 when a determination is made that the voice packet is a silence voice packet. The silence determination process is performed in a way similar to the silence determination steps of Embodiment 2, and therefore the explanation thereof is omitted.

Figure 18:
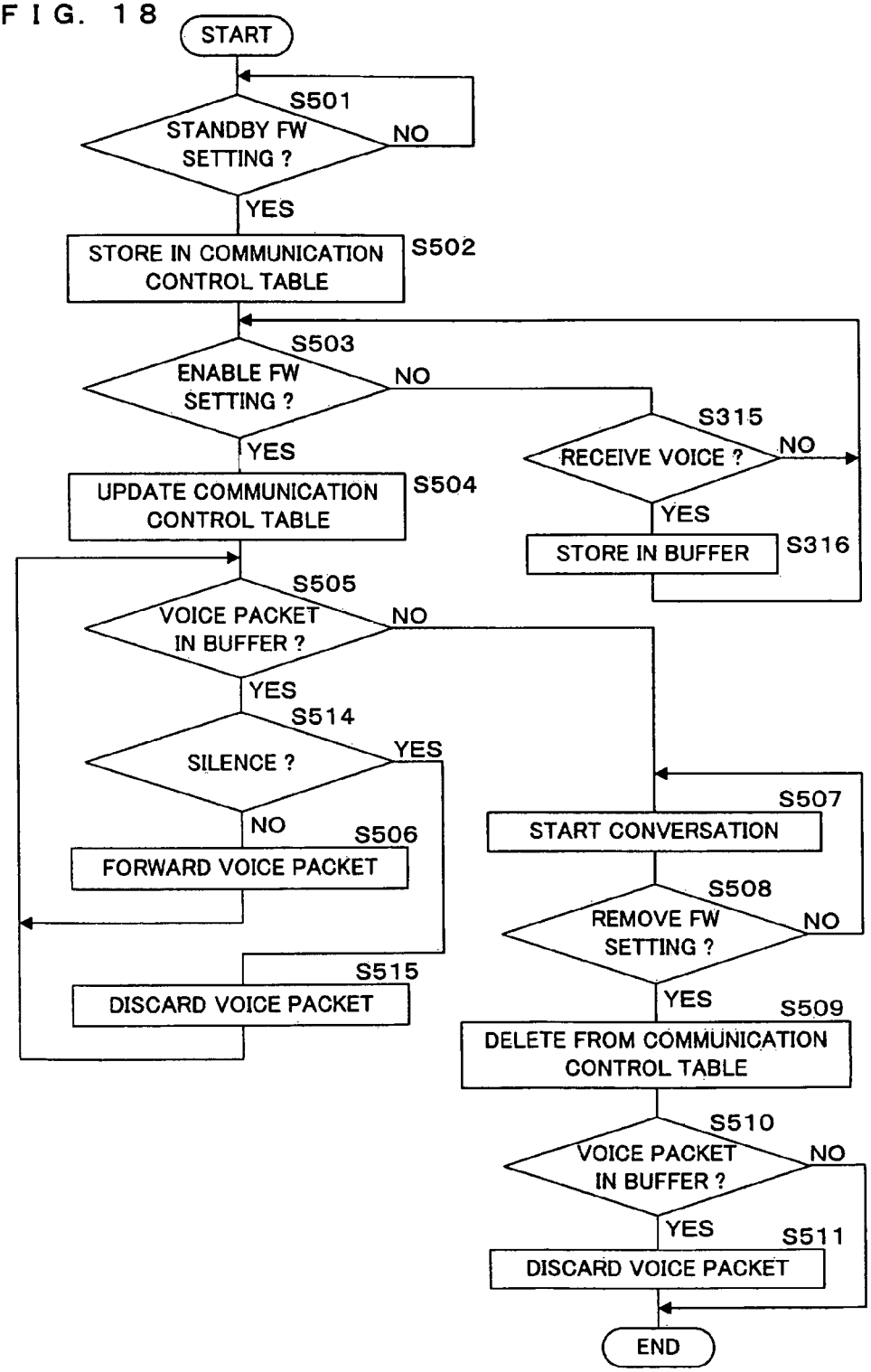
FIG. 18 is a flowchart showing the processing steps performed by the firewall apparatus.

FIG. 18 is a flowchart showing the processing steps performed by the firewall apparatus 2.

Since the operation from step S501 to step S513 in FIG. 18 is similar to the operation from step S101 to step S113 in FIG. 9, the explanation thereof is omitted. As a result of the silence detection process, the control section 20 determines whether or not a voice packet to be sent is a silence voice packet (S514). If a voice packet to be sent is a silence voice packet (S514: YES), the control section 20 causes the silence deleting section 57 to discard the voice packet (S515). Thereafter, the control section 20 executes the processes in and after step S505. If a voice packet to be sent is not a silence voice packet (S514: NO), the control section 20 forwards the voice packet to the memory control section 41 (S506) and executes the processes in and after step S505.

As described above, if a voice packet stored in the memory control section 41 is a silence voice packet, the firewall apparatus 2 discards the voice packet. Accordingly, when the memory capacity of the buffer 24 becomes insufficient after starting the regular process, silence packets that do not affect the conversation are deleted, and therefore it is possible to efficiently use the buffer 24. Moreover, like Embodiment 2, by discarding the silence packets, it is possible to reduce a delay in a conversation.

In Embodiments 1 to 5 described above, although the firewall apparatus 2 and the call control apparatus 3 are provided as separate apparatuses, it is possible to implement the functions of these two apparatuses by a single apparatus. The terminal apparatus 1 can be a cell phone, or a personal computer having a conversation function. Moreover, the terminal apparatus 1, firewall apparatus 2, and call control apparatus 3 can be set within the same network, or different networks. Further, it is possible to store the program of the present invention in a DVD-ROM, a CD-ROM, an FD (Flexible Disk), or any other recording medium.

In addition, the design of specific structures can be changed suitably, and the functions and effects described in the embodiments of the present invention are merely examples of the most preferred functions and effects produced by the present invention. Thus, the functions and effects of the present invention are not limited to those described in the embodiments of the present invention.

As described above, according to the relay apparatus of the present invention, by temporarily storing audio signals received before the establishment of a call session and sending the stored audio signals to a connected party when a call session is established, it is possible to reduce cut-off of the beginning of sound immediately after the establishment of the call session.

A relay apparatus of the present invention further includes first receiving means for receiving first connection information based on a request signal requesting a call session, which is sent from either the source or the destination of an audio signal; second receiving means for receiving second connection information based on a response signal sent from the other of the source and destination responding to the request signal; and establishing means for establishing a call session based on the first and second connection information. According to such a structure, with the function of extracting a communication parameter of the sending side from the first connection information received by the first receiving means, it is possible to select and temporarily store an audio signal sent from the receiving-side terminal apparatus to the sending-side terminal apparatus before the establishment of a call session. Moreover, with the functions of extracting a communication parameter of the receiving side from the second connection information received by the second receiving means and combining it with the communication parameter of the sending side, it is possible to produce the effect of selecting an audio signal that can be relayed to the sending-side terminal when a call session is established and rejecting the relay of other audio signals.

A relay apparatus of the present invention further includes silence determining means for determining whether or not an audio signal to be stored is a silence signal before storing a received audio signal in the audio signal storing means; and first deleting means for deleting an audio signal without storing it in the audio signal storing means when the silence determining means determines that the audio signal is a silence signal. According to such a structure, in the case where audio signals, which were sent before establishing a call session and stored temporarily in the relay apparatus, are relayed after establishing a call session, since a silence audio signal that has little influence on the conversation is deleted, it is possible to save the memory capacity consumed for storing audio signals and shorten a delay in reproducing the sound part.

A relay apparatus of the present invention further includes connection information storing means for storing first and second connection information, wherein the establishing means establishes a call session when the first and second connection information is stored in the connection information storing means. Moreover, a relay apparatus of the present invention includes second determining means for determining whether or not a predetermined time has elapsed since the reception of the first connection information; and second deleting means for deleting the first connection information stored in the connection information storing means when the second determining means determines that the predetermined time has elapsed. According to such a structure, when a predetermined time has elapsed without receiving the second connection information after receiving the first connection information, a determination is made that the call session is invalid and discarding of relevant stored data is enabled, and thus it is possible to prevent the memory capacity from being wasted when a call session is abnormally terminated due to malfunction of the sending/receiving terminals.

Further, a relay apparatus of the present invention includes third determining means for determining whether or not a predetermined time has elapsed since the reception of the second connection information, wherein, when the third determining means determines that the predetermined time has elapsed, the second deleting means deletes the first and second connection information stored in the connection information storing means. According to such a structure, a call that has exceeded the predetermined time since the establishment of a call session after receiving the second connection information is specified by the third determining means, and thus it is possible to avoid a situation in which the memory capacity is wasted and a permission to forward audio signals remain when a call session is disconnected without performing the call termination process.

In addition, a relay apparatus of the present invention includes silence deleting means which, when a call session is established, deletes a silence signal based on results of performing the detection process by the silence determining means on the audio signals stored in the audio signal storing means. According to such a structure, since a silence audio signal that has little influence on a conversation when a call session is established is removed from temporarily stored audio signals, it is possible to shorten a delay in starting reproduction of the sound part of the conversation when a call session is established and forwarding of audio signals stored in the relay apparatus is started.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay apparatus which, relays received audio signals regarding a call, if a call session has been established when an audio signal is received, sends the received audio signal to a connected party which the call session has been established with, the relay apparatus comprising:
   an audio signal storing section for storing a received audio signal if a call session has not been completed but a partial of settings for a call is not received by the relay apparatus when the audio signal is received;
   a sending section for sending the audio signal stored in said audio signal storing section to a connected party when a full of the settings for a call is received by the relay apparatus;
   a first receiving section for receiving first connection information which is included in a request signal which, is sent from either a source or a destination of an audio signal, and requests a call session,
   a second receiving section for receiving second connection information based on a response signal which, is sent from the other of the source and destination, and responds to the request signal; and
   an establishing section for establishing the call session based on the first connection information and the second connection information.

2. The relay apparatus according to claim 1, comprising:
   a silence determining section for determining, before storing a received audio signal in said audio signal storing section, whether or not the received audio signal is a silence signal; and
   a first deleting section for deleting the received audio signal without storing it in said audio signal storing section when said silence determining section determines that the received audio signal is a silence signal.

3. The relay apparatus according to claim 1, comprising:
   an obtaining section for obtaining timestamp data which is contained in a received audio signal and indicates a sent time of the audio signal;
   a first determining section for determining, based on the timestamp data obtained by said obtaining section, whether or not a predetermined time has elapsed since the audio signal was sent;
   a memory control section for storing the audio signal in said audio signal storing section when said first determining section determines that the predetermined time has not elapsed; and
   a second deleting section for deleting the audio signal from said audio signal storing section when said first determining section determines that the predetermined time has elapsed.

4. The relay apparatus according to claim 1, comprising:
   a connection information storing section for storing the first connection information and the second connection information;
   a second determining section for determining whether or not a predetermined time has elapsed since the reception of the first connection information; and
   a second deleting section for deleting the first connection information stored in said connection information storing section when said second determining section determines that the predetermined time has elapsed, wherein said establishing section establishes the call session if the first connection information and the second connection information are stored in said connection information storing section.

5. The relay apparatus according to claim 4, comprising:
a third determining section for determining whether or not a predetermined time has elapsed since the reception of the second connection information, wherein
when said third determining section determines that the predetermined time has elapsed, said second deleting section deletes the first connection information and the second connection information stored in said connection information storing section.

6. The relay apparatus according to claim 1, comprising a silence deleting section for determining whether or not an audio signal stored in said audio signal storing section is a silence signal and deleting a silence audio signal when the call session is established.

7. The relay apparatus according to claim 1, comprising a blocking section for blocking to send an audio signal by said sending section, based on a control rule.

8. A relay apparatus which, relays received audio signals regarding a call, if a call session has been established when an audio signal is received, sends the received audio signal to a connected party with which the call session has been established, the relay apparatus comprising:
an audio signal storing section for storing a received audio signal if a call session has not been completed but a partial of settings for a call is not received by the relay apparatus when the audio signal is received;
a controller capable of performing a step of sending the audio signal stored in said audio signal storing section to a connected party a full of the settings for a call is received by the relay apparatus;
said controller receives first connection information based on a request signal which, is sent from either a source or a destination of an audio signal, and requests a call session,
receives second connection information based on a response signal which, is sent from the other of the source and destination, and responds to the request signal, and
establishes the call session based on the first connection information and the second connection information.

9. The relay apparatus according to claim 8, wherein said controller determines, before storing a received audio signal in said audio signal storing section, whether or not the received audio signal is a silence signal; and
deletes the received audio signal without storing it in said audio signal storing section when determined that the received audio signal is a silence signal.

10. The relay apparatus according to claim 8, wherein said controller obtains timestamp data which is contained in a received audio signal and indicates a sent time of the audio signal;
determines, based on the obtained timestamp data, whether or not a predetermined time has elapsed since the sending of the audio signal;
stores the audio signal in said audio signal storing section when determined that the predetermined time has not elapsed; and
deletes the audio signal from said audio signal storing section when determined that the predetermined time has elapsed.

11. The relay apparatus according to claim 8, comprising:
a connection information storing section for storing the first connection information and the second connection information, wherein
said controller determines whether or not a predetermined time has elapsed since the reception of the first connection information,
deletes the first connection information stored in said connection information storing section when determined that the predetermined time has elapsed, and
establishes the call session if the first connection information and the second connection information are stored in said connection information storing section.

12. The relay apparatus according to claim 11, wherein said controller determines whether or not a predetermined time has elapsed since the reception of the second connection information, and
deletes the first connection information and the second connection information stored in said connection information storing section when determined that the predetermined time has elapsed.

13. The relay apparatus according to claim 8, wherein said controller determines whether or not an audio signal stored in said audio signal storing section is a silence signal and deletes a silence audio signal when the call session is established.

14. The relay apparatus according to claim 8, wherein said controller blocks sending of an audio signal to a connected party, based on a set control rule.

15. A computer-readable memory product storing a computer program which relays received audio signals regarding a call, said computer program comprising:
a step of causing a computer, which comprises an audio signal storing section for storing an audio signal, to store a received audio signal in said audio signal storing section if a call session has not been completed but a partial of settings for a call is not received by the relay apparatus when the audio signal is received;
a step of causing said computer, when the call session is established, to send the audio signal stored in said audio signal storing section to a connected party with which a full of the settings for a call is received;
said computer program comprises a step of causing said computer to establish the call session based on first connection information based on a request signal which is sent from either a source or a destination of the audio signal and requests a call session, and second connection information based on a response signal which is sent from the other of the source and destination and responds to the request signal.

16. The memory product according to claim 15, wherein said computer program comprises:
a step of causing said computer to determine whether or not the audio signal stored in said audio signal storing section is a silence signal; and
a step of causing said computer to delete the audio signal when determined that the audio signal is a silence signal.

17. The memory product according to claim 15, wherein said computer program comprises:
a step of causing said computer to determine, based on timestamp data which is contained in a received audio signal and indicates a sent time of the audio signal, whether or not a predetermined time has elapsed since the sending of the audio signal;
a step of causing said computer to store the audio signal in said audio signal storing section when determined that the predetermined time has not elapsed; and a step of causing said computer to delete the audio signal from said audio signal storing section when determined that the predetermined time has elapsed.

18. The memory product according to claim 15, wherein said computer further comprises a connection information storing section for storing the first connection information and the second connection information, and said computer program comprises: a step of causing said computer to determine whether or not a predetermined time has elapsed since the reception of the first connection information; a step of causing said computer to delete the first connection information stored in said connection information storing section when determined that the predetermined time has elapsed; and a step of causing said computer to establish the call session if the first connection information and the second connection information are stored in said connection information storing section.

19. The memory product according to claim 18, wherein said computer program comprises:
a step of causing said computer to determine whether or not a predetermined time has elapsed since the reception of the second connection information; and
a step of causing said computer to delete the first connection information and the second connection information stored in said connection information storing section, when determined that the predetermined time has elapsed.

20. The memory product according to claim 15, wherein said computer program comprises a step of causing said computer to block sending of an audio signal to a connected party, based on a set control rule.

* * * * *